(12) United States Patent
Machida et al.

(10) Patent No.: US 10,571,202 B2
(45) Date of Patent: Feb. 25, 2020

(54) HEAT STORAGE APPARATUS

(71) Applicant: Panasonic Corporation, Osaka (JP)

(72) Inventors: Hironobu Machida, Nara (JP); Motohiro Suzuki, Osaka (JP); Shinsuke Takeguchi, Osaka (JP); Takashi Kubo, Hyogo (JP); Kentaro Shii, Osaka (JP); Naoyuki Tani, Osaka (JP); Tatsuya Nakamura, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 198 days.

(21) Appl. No.: 15/723,243

(22) Filed: Oct. 3, 2017

(65) Prior Publication Data

US 2018/0112931 A1    Apr. 26, 2018

(30) Foreign Application Priority Data

Oct. 20, 2016 (JP) .................... 2016-205836
Apr. 24, 2017 (JP) .................... 2017-085615

(51) Int. Cl.
*F28D 20/02* (2006.01)
*F28F 13/12* (2006.01)
(Continued)

(52) U.S. Cl.
CPC ....... *F28D 20/028* (2013.01); *B60H 1/00492* (2013.01); *F01P 5/12* (2013.01); *F01P 11/20* (2013.01); *F02D 41/068* (2013.01); *F02N 19/10* (2013.01); *F28D 20/02* (2013.01); *F28F 13/125* (2013.01); *F01P 2011/205* (2013.01); *F28D 2020/0073* (2013.01); *Y02E 60/145* (2013.01)

(58) Field of Classification Search
CPC .......... F28D 20/028; F28D 20/02; F28D 2020/0073; F28D 20/003; F28D 20/00; F28D 2020/0017; F28D 2020/0021; F28D 2020/0069; F28D 15/02; F28D 15/0266; F28D 15/025; F28D 15/0208; B60H 1/00492; F01P 5/12; F01P 11/20; F01P 2011/205; F02D 41/068; F02N 19/10; F28F 13/125; Y02E 60/145; Y02E 60/14; F24V 30/00
USPC .......... 165/10, 6, 236, 902, 104.15, 104.17, 165/104.18, 104.22, 104.25, 104.31
See application file for complete search history.

(56) References Cited

U.S. PATENT DOCUMENTS 642,535 A * 1/1900 Snyder
2,996,894 A * 8/1961 Shade ................ B01J 19/0013
62/59

(Continued)

FOREIGN PATENT DOCUMENTS

JP      7-012479      1/1995
WO      2007/023794   3/2007

*Primary Examiner* — Justin M Jonaitis
(74) *Attorney, Agent, or Firm* — McDermott Will & Emery LLP

(57) ABSTRACT

The heat storage apparatus of the present disclosure includes a casing, a heat storage material that is located in the casing, a stirrer that is located in the casing, that is in contact with the heat storage material, and that rotates to stir the heat storage material, and a projection that is in contact with the heat storage material, that projects from the stirrer, and that rotates with rotation of the stirrer. The projection is continuously in contact with an inner face of the casing while the stirrer rotates.

20 Claims, 15 Drawing Sheets

(51) Int. Cl.
*B60H 1/00* (2006.01)
*F01P 5/12* (2006.01)
*F01P 11/20* (2006.01)
*F02D 41/06* (2006.01)
*F02N 19/10* (2010.01)
*F28D 20/00* (2006.01)

(56) References Cited

U.S. PATENT DOCUMENTS

| | | | | |
|---|---|---|---|---|
| 4,219,072 | A | * | 8/1980 | Barlow, Sr. ............ F28D 20/023 165/10 |
| 4,249,083 | A | * | 2/1981 | Bitterly .................... F01D 1/24 290/1 R |
| 4,491,172 | A | * | 1/1985 | Hitchin ................. F28D 20/021 126/618 |
| 4,540,501 | A | * | 9/1985 | Ternes .................... C09K 5/04 165/104.21 |
| 2008/0233527 | A1 | * | 9/2008 | Heinrich ............. F27B 14/0806 432/13 |
| 2009/0194257 | A1 | * | 8/2009 | Niu ........................ F28D 15/00 165/104.17 |
| 2009/0277411 | A1 | | 11/2009 | Hamaguchi et al. |
| 2013/0228308 | A1 | * | 9/2013 | Abhari ................... C09K 5/063 165/104.17 |

* cited by examiner

HEAT STORAGE APPARATUS

BACKGROUND

1. Technical Field

The present disclosure relates to a heat storage apparatus.

2. Description of the Related Art

A heat storage material is a material that can store heat or cold, and heat or cold stored in the heat storage material is radiated according to need. The heat storage material that can mainly utilize exothermic reaction and endothermic reaction, which are associated with a change in the phase of a substance, to store hear or cold is referred to as latent heat storage material. In this specification, the latent heat storage material that can radiate cold according to need may be referred to as latent cold storage material or merely cold storage material. The latent heat storage material includes a material having a supercooling property, and the technique for releasing supercooling of such latent heat storage material.

For example, Japanese Unexamined Patent Application Publication No. 7-12479 (Patent document 1) describes a heat storage apparatus 300 as illustrated in FIG. 14A. The heat storage apparatus 300 includes an enclosed casing 301, a heat storage material 302, a propeller (stimulus-applying member) 310, and a motor 320. The heat storage material 302 is sealed in the enclosed casing 301, and has the supercooling property. The heat storage material 302 is, for example, trihydrate sodium acetate. The propeller 310 can apply a stimulus to the heat storage material 302. The motor 320 rotates the propeller 310. A permanent magnet 312 is attached to a rotating shaft of the propeller 310, and proximately faces the inner face of the enclosed casing 301. The motor 320 is disposed outside the enclosed casing 301, and is supported by a supporting plate 321. The supporting plate 321 is attached to the outer face of the enclosed casing 301. A permanent magnet 322 is attached to a rotating shaft of the motor 320, and proximately faces the outer face of the enclosed casing 301. Blades of the propeller 310 act as scissors, thereby applying a fierce stimulus to the heat storage material 302 to effectively guide heat radiation.

International Publication No, WO2007/023794 (Patent document 2) describes a nucleation device 502 as illustrated in FIG. 14B. The nucleation device 502 includes a support frame 520, a support piece 521, a shaft frame member 522, a rotating body 523, a plurality of claws 524, a water wheel 525, and a plate-like member 529. The shaft frame member 522 passes through the side wall of the casing 514 to be disposed in the casing 514 and a water jacket 513. A shaft 522a is rotatably supported in the shaft frame member 522. The rotating body 523 is rotatably coupled to the shaft 522a. The plurality of claws 524 radially extend from the rotating body 523. The water wheel 525 is rotatably coupled to the shaft 522a. The plate-like member 529 is formed of a bimetal. When cooling water flowing in the water jacket 513 rotates the water wheel 525, the rotary force of the water wheel 525 is transmitted to the rotating body 523 via the shaft 522a, rotating each of the claws 524. The rotating claws 524 slide on the plate-like member 529, and scratch the surface of the plate-like member 529 to generate a new face. The new face is brought into direct contact with a supercooled heat storage material X to nucleate the heat storage material X. The heat storage material X is, for example, trihydrate sodium acetate.

SUMMARY

According to the techniques described in Patent documents 1 and 2, time required to complete crystallization of the heat storage material has not been specifically considered. One non-limiting and exemplary embodiment provides a heat storage apparatus capable of completing crystallization of a heat storage material within a short time.

In one general aspect, the techniques disclosed here feature a heat storage apparatus, including: a casing; a heat storage material that is located in the casing; a stirrer that is located in the casing, that is in contact with the heat storage material, and that rotates to stir the heat storage material; and a projection that is in contact with the heat storage material, that projects from the stirrer, and that rotates with a rotation of the stirrer, in which the projection is continuously in contact with an inner surface of the casing while the stirrer rotates.

The above-mentioned heat storage apparatus is effective in completing crystallization of the heat storage material within a short time.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1A:
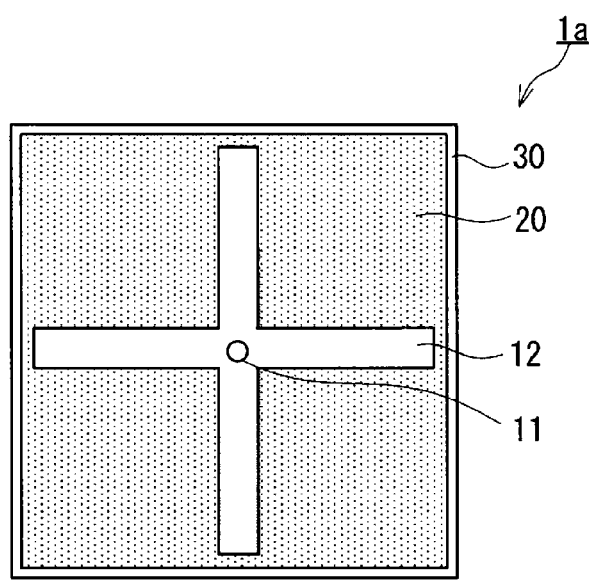
FIG. 1A is an upper view illustrating an example of a heat storage apparatus of the present disclosure.

<Knowledge Based on Examination of the Inventors>

If crystallization of the heat storage material could be completed within a short time (for example, within one minutes), the heat storage material can be used in more extensive applications. For example, in an automobile having the function of automatically performing idling stop, the heat storage material can be used to cool the inside of the automobile during idling stop. In this case, during idling stop, cold stored in the heat storage material is used in place of cold acquired by driving a compressor by means of an engine. That is, during travelling of the automobile, the heat storage material is crystallized using the compressor to store cold, while, during idling stop, the cold storage material is melted to discharge cold. This cycle can be repeated. In consideration of automobile traffic situations in urban cities, the interval between traffic lights may be small and thus, continuous driving time period of the automobiles may be short. For this reason, it is desired that crystallization of the heat storage material can be completed within a shorter time, and cold can be stored as latent heat throughout the heat storage material within a short time.

Thus, the Inventors has studied the technique of crystallizing the heat storage material within a short time day and night. As a result of the study, the Inventors found that crystallization of the heat storage material can be completed within a short time by bringing a projection protruding from a stirrer disposed in a casing that houses the heat storage material continuously into contact with an inner face of the casing while the stirrer rotates. Based on the new knowledge, the Inventors devised a heat storage apparatus of the present disclosure. It should be noted that knowledge is based on the study of the Inventors, and is not any prior art.

A first aspect of the present disclosure provides a heat storage apparatus, including: a casing; a heat storage material that is located in the casing; a stirrer that is located in the casing, that is in contact with the heat storage material, and that rotates to stir the heat storage material; and a projection that is in contact with the heat storage material, that projects from the stirrer, and that rotates with a rotation of the stirrer, in which the projection is continuously in contact with an inner surface of the casing while the stirrer rotates.

According to the first aspect, the projection is concurrently in contact with the inner face of the casing while the stirrer rotates. The continuous contact of the projection with the inner face of the casing, which is caused by rotation of the stirrer, changes dimension minute gaps formed between minute irregularities on the face of the projection and minute irregularities on the inner face of the casing to generate a pressure fluctuation over time. Due to the pressure fluctuation, crystalline nuclei of the heat storage material are continuously generated. With stirring of the rotating stirrer, the continuously generated crystalline nuclei diffuse throughout the heat storage material. The diffused crystalline nuclei promote new crystalline nuclei by chain reaction. Thus, crystallization of the whole the heat storage material in the casing simultaneously progresses. As a result, supercooling of the heat storage material can be released, and crystallization of the heat storage material can be rapidly completed to shorten time required for cold storage. As described above, according to the first aspect, since crystallization of the heat storage material can be completed within a short time, for example, even when driving time of the automobile between traffic lights is short, crystallization of the whole heat storage material can be completed.

According to the technique described in Japanese Unexamined Patent Application Publication No. 7-12479 (Patent document 1), although the propeller 310 and the permanent magnet 312 rotate in the enclosed casing 301, the propeller 310 and the permanent magnet 312 do not rotate in contact with the inner face of the enclosed casing 301. Patent document 1 fails to describe the presence of a projection, and also fails to describe that a projection is continuously in contact with the inner face of the enclosed casing 301. Thus, a pressure fluctuation over time never occurs due to continuous contact of the rotating shaft of the propeller 310 or the permanent magnet 312 with the enclosed casing 301. Therefore, the crystallization of the heat storage material can be hardly completed within a short time.

According to the technique described in International Publication No. WO2007/023794 (Patent document 2), the rotating claws 524 slide on the plate-like member 529, and scratch the face of the plate-like member 529 to form a new face. The supercooled heat storage material X is in direct contact with the new face to be nucleated. Patent document 2 fails to describe that crystalline nuclei generated by nucleation of the heat storage material X are diffused throughout the heat storage material. In fact, since the plate-like member 529 is located away from the rotating center of the rotating body 523, it takes a long time that the crystalline nuclei generated by contact of the heat storage material X with the new face of the plate-like member 529 diffuse throughout the heat storage material X. Therefore, according to the technique described in Patent document 2, crystallization of the heat storage material cannot be completed within a short time. Moreover, since the rotating claws 524 are in direct contact with the plate-like member 529, the shaft frame member 522 is repeatedly subject to a bending load. Further, when contacting with the rotating claws 524, the plate-like member 529 is worn or damaged to lose its reliability. Thus, the shaft frame member 522 needs to be specially attended so as to have a necessary strength.

In addition to the first aspect, a second aspect of the present disclosure provides the heat storage apparatus, in which the stirrer starts rotation, stops rotation, or changes rotation speed according to a physical change occurred outside the casing. According to the second aspect, rotating of the stirrer is controlled by changing a physical change outside in the casing.

In addition to the first or second aspect, a third aspect of the present disclosure provides the heat storage apparatus, in which the stirrer includes a magnetic material, is isolated from the outside of the casing, and rotates according to a change in a magnetic field generated outside the casing. According to the third aspect, no mechanism for transmitting a motive power generated outside the casing to the stirrer is required, and the casing can be highly sealed.

In addition to any one of the first to third aspects, a fourth aspect of the present disclosure provides the heat storage apparatus, in which given that areas found when the stirrer and the projection are projected onto a plane that is perpendicular to a rotating axis of the stirrer in a direction that is parallel to the rotating axis are P1 and P2, respectively, P2 is 90% of P1 or less. When the stirrer 12 is light-weighted, the pressure caused by contact of the projection 15 with the inner face of the casing 30 becomes small, and a pressure fluctuation occurring due to continuous contact of the projection 15 with the inner face of the casing 30 with rotation of the stirrer 12 tends to be small. According to the fourth aspect, even when the stirrer is light-weighted, the area of the projection is not too much, and the pressure caused by contact of the projection with the inner face of the casing is large. This can generate a sufficient large pressure fluctuation to improve the efficiency of generating crystalline nucleus. Accordingly, crystallization of the heat storage material can be completed within a short time more reliably.

In addition to any one of the first to fourth aspects, a fifth aspect of the present disclosure provides the heat storage apparatus, in which the stirrer and the projection include metal or alloy, the stirrer is not in contact with the inner face of the casing while the stirrer rotates, and a sum of surface areas of the stirrer and the projection is 10% of an area of the inner face of the casing or more. In the case where the stirrer and the projection include metal or alloy, and the sum of surface areas of the stirrer and the projection is 10% of the area of the inner face of the casing or more, even when the sum of volumes of the stirrer and the projection is small relative to the volume of the heat storage material, phase transition heat of the heat storage material 20 can be prevented from concentrating at a particular site, and the heat can be readily radiated to the outside of the heat storage material 20. As a result, crystallization of the heat storage material is easy to progress. Further, when the sum of the surface areas of the stirrer and the projection is 10% of the area of the inner face of the casing or more, the stirrer and the projection can have a large mass. Thus, the rotary force (inertial force) of the rotating stirrer exceeds the viscous force of the heat storage material, allowing the stirrer to smoothly rotate. Thereby, the generated crystalline nuclei efficiently diffuses throughout the heat storage material. As described above, according to the fifth aspect, when the sum of volumes of the stirrer and viscosity of the heat storage material is relatively high, crystallization of the heat storage material can be completed within a short time.

In addition to any one of the first to fifth aspects, a sixth aspect of the present disclosure provides the heat storage apparatus, in which the stirrer is shaped like a plate having a flat face or a curved face, a rotating axis of the stirrer passes the center of gravity of the stirrer and a tip of the projection, the projection has a portion having a gradually-reduced cross-sectional area taken along a plane perpendicular to the rotating axis toward the tip, and when viewed along the rotating axis, portion of the projection is absence so as not to overlap the stirrer. In other words, when viewing the stirrer and the projection along the rotating axis; all portions of the projection overlaps the stirrer.

In addition to any one of the first to sixth aspects, a seventh aspect of the present disclosure provides the heat storage apparatus, in which the stirrer includes: a first plate that has the center of gravity on a rotating axis of the stirrer, and that is disposed about the rotating axis; and a blade that is fixed to the first plate away from the center of gravity of the first plate; that is thicker than a thickness of the first plate in a direction that is perpendicular to a principal face of the first plate, and that has a front face that is in contact with the heat storage material in a rotating direction of the stirrer, and the heat storage apparatus further comprises a first space, the first space is present between the inner face of the casing and the first plate along the rotating axis of the stirrer, given that a portion of the blade that is closest to the rotating axis of the stirrer is defined as a first end, and a locus that the first end follows while the stirrer rotates is defined as a first locus, the first space is present between the first locus and the projection, and with rotation of the stirrer, the heat storage material is able to circulate the first space.

Crystallization of the heat storage material generates crystallization heat. Thus, in the vicinity of the site where crystalline nuclei occurs, the temperature of the heat storage material rises, hampering crystallization of the heat storage material. For this reason, to rapidly crystallize the heat storage material, desirably, crystallization heat is rapidly removed. According to the seventh aspect, generated crystallization heat is transmitted through the first plate to the outside of the casing. This can rapidly remove crystallization heat. In addition, since the stirrer has the blade; crystalline nuclei are easy to rapidly diffuse throughout the casing. Further, due to the presence of the first space between the first locus and the projection, crystalline nuclei of the heat storage material readily diffuse from the first space to the outside of the first space, and the liquid heat storage material outside the first space is easily guided into the first space. For this reason, crystalline nuclei generated due to continuous contact of the projection with the inner face of the casing with rotation of the stirrer are easily dispersed to the outside of the first space in the state where crystallization heat occurred from generation of crystalline nuclei is radiated through the first plate. In this manner, crystalline nuclei are readily dispersed to the outside of the first space, with the difference between the solidifying point of the heat storage material and the temperature of the crystalline nuclei being large. As a result, due to the presence of crystalline nuclei dispersed outside the first space, crystallization of the heat storage material can be readily completed within a short time.

In addition to seventh aspect, a eighth aspect of the present disclosure provides the heat storage apparatus, in which a distance between the rotating axis of the stirrer and the first end is in a range of 40% to 100% of a distance between an end of the first plate furthest from the rotating axis of the stirrer and the rotating axis. According to the eighth aspect, the first space can have a desirable capacity in terms of circulation of the heat storage material with rotation of the stirrer.

In addition to the seventh or eighth aspect, a ninth aspect of the present disclosure provides the heat storage apparatus, in which a shortest distance between the inner face of the casing and the first plate is 2 to 100 times as the thickness of the first plate. According to the ninth aspect, the first space can have a desirable capacity in terms of circulation of the heat storage material with rotation of the stirrer.

In addition to any one of the seventh to ninth aspects, a tenth aspect of the present disclosure provides the heat storage apparatus, in which the casing has an opposed face that faces the inner face of the casing, and a distance between the inner face of the casing and the first plate is larger than a distance between the opposed face of the casing and the first plate along the rotating axis of the stirrer. According to the tenth aspect, the first space can have a desirable capacity in terms of circulation of the heat storage material with rotation of the stirrer. In addition, since the distance between the opposed face of the casing and the projection is small relative to the volume of the heat storage material, or the first plate is small, crystallization heat received by the first plate is readily radiated to the outside of the casing.

In addition to any one of the seventh to tenth aspects, a eleventh aspect of the present disclosure provides the heat storage apparatus, further including given that a portion of the projection that is furthest from the rotating axis of the stirrer is defined as a second end, and a locus that the first end follows while the stirrer rotates is defined as a second locus, a current-adjusting plate that is disposed in the casing, that is located on the outer side of the second locus in a direction that is perpendicular to the rotating axis, and that has a proximal portion and a distal portion located further from the second locus than the proximal portion. According to the eleventh aspect, the heat storage material that is sent from the first space by means of the stirrer and flows in the rotating direction of the stirrer is intercepted by the current-adjusting plate, and travels away from the second locus. Thereby, crystalline nuclei are supplied to site remote from the second locus in the casing, such that crystallization of the heat storage material is readily completed within a short time. Due to the function of the current-adjusting plate, a portion of the heat storage material supplied to the site remote from the second locus in the casing flows along the inner side face of the casing, and is guided to the first space by means of the stirrer. In this manner, the heat storage material is readily circulated throughout the casing. As a result, even when the internal space of the casing is large relative to the stirrer, crystalline nuclei are readily dispersed to sites remote from the second locus in the casing, and crystallization of the heat storage material can be easily completed within a short time.

In addition to the eleventh aspect, a twelfth aspect of the present disclosure provides the heat storage apparatus, in which the casing has an inner side face that extends from and end of the inner face of the casing along the rotating axis of the stirrer to surround the stirrer, the current-adjusting plate is located away from the inner side face, and a shortest distance between the second locus and the current-adjusting plate is smaller than a distance between the inner side face of the casing and the current-adjusting plate. According to the twelfth aspect, since the shortest distance between the second locus and the current-adjusting plate is small, a flow resistance of the heat storage material is large in the gap between the stirrer and the current-adjusting plate. For this reason, the heat storage material that is sent from the first space by means of the stirrer flows along the current-adjusting plate, and easily flows into the gap between the inner side face of the casing and the current-adjusting plate. Thereby, the heat storage material flows along the current-adjusting plate and the inner side face of the casing, and is guided to the first space by means of the stirrer. In this manner, the heat storage material is readily circulated throughout the casing.

In addition to the eleventh or twelfth aspect, a thirteenth aspect of the present disclosure provides the heat storage apparatus, in which the casing has an opposed face that faces the inner face of the casing, and the current-adjusting plate is made of a material having a higher thermal conductivity than a thermal conductivity of the heat storage material, and the current-adjusting plate is in contact with the inner face of the casing and the opposed face. The crystalline nuclei diffused throughout the casing promotes generation of new crystalline nuclei, thereby growing crystals. Crystallization heat generated by growth of crystals needs to be radiated to the outside of the casing. According to the thirteenth aspect, since the current-adjusting plate is made of a material having a higher thermal conductivity than the thermal conductivity of the heat storage material, and is in contact with the inner face of the casing and the opposed face of the casing, crystallization heat generated by growth of crystals of the heat storage material is readily radiated to the outside of the casing, and crystallization of the heat storage material can be completed within a short time.

In addition to any one of the eleventh to thirteenth aspects, a fourteenth aspect of the present disclosure provides the heat storage apparatus, in which the distal portion of the current-adjusting plate is curved in the rotating direction of the stirrer. According to the fourteenth aspect, since the heat storage material flows along the distal portion in the rotating direction of the stirrer at sites remote from the second locus, due to the function of the current-adjusting plate, a portion of the heat storage material supplied to sites remote from the second locus in the casing readily flows toward the first space. Thus, the heat storage material is easily circulated in the first space.

In addition to any one of the eleventh to fourteenth aspects, a fifteenth aspect of the present disclosure provides the heat storage apparatus, in which the inner face of the casing is a rectangle having a long side that is twice of a short side or more in length, and the proximal portion extends along the long side of the inner face. According to the fifteenth aspect, even when the inner face of the casing is a rectangle having a long side that is twice of a short side or more in length, since the proximal portion of the current-adjusting plate extends along the long side of the inner face of the casing, the heat storage material including crystalline nuclei is easily supplied to corners of the casing, and crystallization of the heat storage material can be readily completed within a short time.

In addition to any one of the eleventh to fourteenth aspects, a sixteenth aspect of the present disclosure provides the heat storage apparatus, in which the inner face of the casing is a rectangle having a long side that is twice of a short side or more in length, square, or circular, and the plurality of radially arranged current-adjusting plate are provided. According to the sixteenth aspect, in the case where the aspect ratio of the inner face of the casing is low, using the plurality of radially arranged current-adjusting plates, the heat storage material including crystalline nuclei is readily supplied to sites remote from the second locus throughout the casing. Therefore, crystallization of the heat storage material can be readily completed within a short time.

In addition to any one of the eleventh to fourteenth aspects, a seventeenth aspect of the present disclosure provides the heat storage apparatus, in which the current-adjusting plate is U-shaped so as to be opened to the second locus and curved in the distal portion. According to the seventeenth aspect, the heat storage material sent from the first space by means of the stirrer flows along the current-adjusting plate, and is away from the second locus. Meanwhile, the heat storage material located in the vicinity of the distal portion flows along the current-adjusting plate, and comes closer to the second locus. Thereby, the heat storage material is readily circulated between the first space and the site near the distal portion. As a result, crystallization of the heat storage material can be readily completed in the whole casing within a short time.

In addition to any one of the seventh to ninth aspects, a eighteenth aspect of the present disclosure provides the heat storage apparatus, in which the casing has an opposed face that faces the inner face of the casing, and the stirrer further includes a second plate that has the center of gravity on the rotating axis of the stirrer, and that is disposed between the opposed face and the first plate along the rotating axis of the stirrer, and about the rotating axis, the first plate has a first through hole, and the second plate has a second through hole.

According to the eighteenth aspect, since crystallization heat occurred by generation of crystalline nuclei is transmitted through the first plate as well as the second plate to the outside of the casing, even when the distance between the inner face of the casing and the opposed face of the casing is relatively large, crystallization heat can be rapidly removed. In addition, a portion of crystalline nuclei generated by continuous contact of the projection and the inner face of the casing with rotation of the stirrer easily moves the first through hole, in some cases, the second through hole, and moves along the rotation axis of the stirrer. Thus, when the distance between the inner face of the casing and the opposed face of the casing is relatively large, also between the opposed face of the casing and the first plate along the rotation axis of the stirrer, crystalline nuclei are readily dispersed throughout the casing. Therefore, crystallization of the heat storage material can be readily completed within a short time.

In addition to the eighteenth aspect, a nineteenth aspect of the present disclosure provides the heat storage apparatus, further including given that a portion of the projection that is furthest from the rotating axis of the stirrer is defined as a second end, and a locus that the first end follows while the stirrer rotates is defined as a second locus, a partition that is located on the outer side of the second locus and that partitions an internal space of the casing along the rotating axis of the stirrer. According to the nineteenth aspect, the space that is closer to the opposed face of the casing than the first plate along the rotating axis among the plurality of spaces partitioned by the partition, convection of crystalline nuclei that passes the first through hole, in some cases, the second through hole and moves along the rotation axis of the stirrer occurs. Thus, crystalline nuclei are readily dispersed throughout the casing. As a result, crystallization of the heat storage material can be readily completed in the whole casing within a short time.

In addition to the nineteenth aspect, a twentieth aspect of the present disclosure provides the heat storage apparatus, further including a plurality of current-adjusting plates that are disposed in respective spaces partitioned by the partition, and that each have a proximal portion and a distal portion located further from the second locus than the proximal portion. According to the twentieth aspect, in each space partitioned by the partition, crystalline nuclei are readily supplied to sites remote from the second locus, crystallization of the heat storage material can be readily completed within a short time.

Embodiments of this disclosure will be described below with reference to figures. The following description exemplifies the heat storage apparatus of this disclosure, and the present disclosure is not limited to the description.

First Embodiment

Figure 1B:
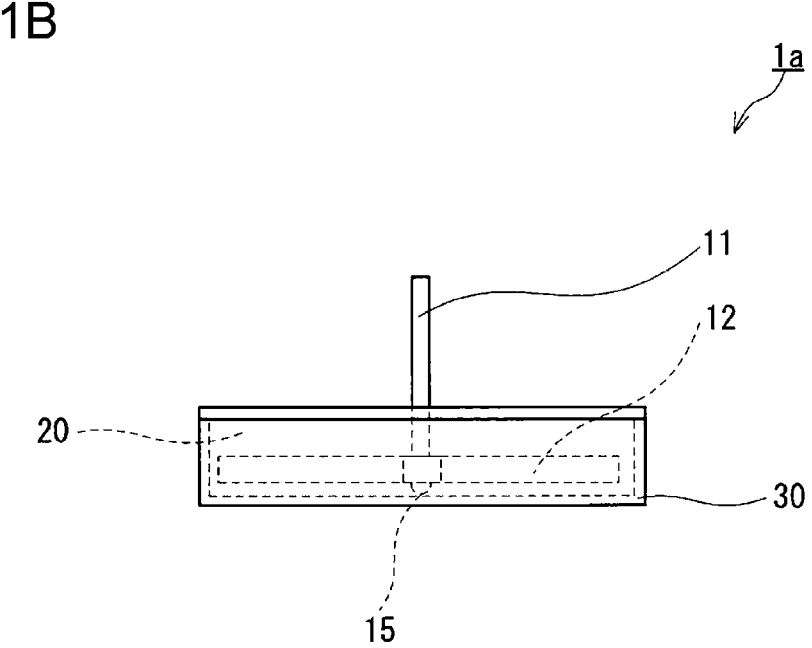
FIG. 1B is a front view illustrating the heat storage apparatus illustrated in FIG. 1A.

As illustrated in FIGS. 1A and 1B, a heat storage apparatus 1a according to First embodiment includes a heat storage material 20, a casing 30, a stirrer 12, and a projection 15. The heat storage material 20 is located in the casing 30. The stirrer 12 is located in the casing 30, is in contact with the heat storage material 20, and rotates to stir the heat storage material 20. As illustrated in FIG. 1B, the projection 15 protrudes from the stirrer 12. In other words, the projection 15 is connected to the stirrer 12. The projection 15 rotates with a rotation of the stirrer 12. The projection 15 is continuously in contact with an inner face of the casing 30 that is in contact with the heat storage material 20 while the stirrer 12 rotates. In this case, typically, a tip of the projection 15 is continuously in contact with the inner face of the casing 30.

Typically, the heat storage material 20 is a latent heat storage material, and the heat storage apparatus 1a crystalize the heat storage material 20 in the liquid phase to store cold. In the heat storage apparatus 1a, for example, when cold as latent heat is stored in the heat storage material 20, the stirrer 12 rotates. While the stirrer 12 rotates, the projection 15 protruding from the stirrer 12 is continuously in contact with the inner face of the casing 30 that is in contact with the heat storage material 20. This generates an inertial force that is a product of the weight of the stirrer 12 and rotation acceleration to stir the heat storage material 20. This causes convention of the heat storage material 20. Further, the contact of the projection 15 rotating with the stirrer 12 with the inner face of the casing 30 changes dimension of minute gaps formed between minute (for example, on the order of nm) irregularities on the face of the tip of the projection 15 and minute (for example, on the order of nm) irregularities on the inner face of the casing 30, generating a pressure fluctuation over time. Due to the pressure fluctuation, minute crystalline nuclei of the heat storage material 20 are continuously generated. With stirring with the rotation of the stirrer 12, the continuously generated minute crystalline nuclei rapidly diffuse throughout the heat storage material 20. The diffused crystalline nuclei promote generation of new crystalline nuclei by chain reaction. For this reason, starting from the minute crystalline nuclei that diffuse throughout the heat storage material 20 in the casing 30, crystallization simultaneously progresses. That is, a distance in which one minute crystalline nucleus grows becomes smaller. Accordingly, supercooling of the heat storage material 20 can be released, and crystallization of the heat storage material 20 can be rapidly completed to shorten time required for cold storage. For example, crystallization of the heat storage material 20 can be readily completed within a short time such as one minute.

In urban cities, an automobile may stop according to a traffic light after an elapse of about one minute from start-up. Thus, when the heat storage apparatus 1a is mounted to cool inside of the automobile during idling stop, it is desired that the heat storage apparatus 1a can complete crystallization of the heat storage material 20 within one minute.

According to, for example, a physical change outside in the casing 30, the stirrer 12 starts rotation, stops rotation, or changes the rotation speed.

As illustrated in FIGS. 1A and 1B, a rotating shaft 11 is connected to the stirrer 12. The rotating shaft 11 extends along the rotating axis of the stirrer 12. The stirrer 12 is fixed to an end of the rotating shaft 11. The rotating shaft 11 is partially disposed in a through hole in the casing 30, and extends to the outside of the casing 30. The rotating shaft 11 is coupled to a motor (not illustrated), and rotates with activation of the motor. In this case, start of rotation of the motor, stop of rotation of the motor, and change in rpm of the motor each correspond to a physical change occurring outside the casing 30.

The configuration of the casing 30 is not specifically limited. However, the casing 30 is typically, an enclosed casing made of metal, alloy, or resin having a good corrosion resistance to the heat storage material 20. The shape of the casing 30 is, for example, block-like, plate-like, or sheet-like. In the case where the area of the inner face of the casing 30 is large relative to the internal volume of the casing 30, when the heat storage material 20 functions as the cold storage material, responsiveness of cold storage or cold radiation can be improved.

The material for the casing 30 is, preferably, metal having good thermal conductivity, such as aluminum, copper, and stainless steel. The material for the casing 30 may be resin having a good corrosion resistance such as fluororesin, polyphenylene sulfide (PPS) resin, and polypropylene (PP) resin. The casing 30 may be made of a flexible material such as a laminated film including aluminum foil and resin film.

For example, when the heat storage apparatus 1a is used to cool the inside of the automobile during idling stop, it is need to repeat the cycle consisting of heat storage in the heat storage material 20 and heat radiation from the heat storage material 20, within a short time. However, in many cases, the heat storage material 20 has low thermal conductivity. Thus, shape and size of the casing 30 are desirably selected such that heat radiated from the heat storage material 20 can be rapidly discharged to the outside of the casing 30. For example, the heat storage material 20 in the sold state has a thickness of preferably 5 mm or less, more preferably 3 mm or less, and still more preferably 2 mm or less. For example, the size of the casing 30 in a particular direction is determined according to the desirable thickness of the heat storage material 20. For example, as illustrated in FIG. 1B, the size of the inner face of the casing 30 in the direction that is parallel to the rotating axis of the stirrer 12 is smaller than the size of the inner face of the casing 30 in the direction that is perpendicular to the rotating axis of the stirrer 12. A fin for promoting heat transfer may be disposed in the casing 30 to divide the heat storage material 20 in the casing 30 into a plurality of thin heat storage materials 20 each having a desirable thickness.

The stirrer 12 may be formed of a plate having a flat face or a curved face, a rod, or a plurality of blades. The stirrer 12 is shaped so as to effectively stir the heat storage material 20 in the casing 30. For example, the stirrer 12 may be a rectangular thin plate such as a heat conductive fin, a partially-bent rectangular thin plate, or such thin plates coupled to each other. The rotating axis of the stirrer 12 may pass the center of gravity of the stirrer 12 and the tip of the projection 15. The projection 15 may include a portion having a gradually-reduced cross-sectional area taken along a plane perpendicular to the rotating axis toward the tip. The projection 15 may be conical or tapered. When viewed along the rotating axis, the stirrer 12 and the projection 15 may be configured so as not to overlap each other. It is desired that the tip of the projection 15 is in point-contact with the inner face of the casing 30 while the stirrer 12 rotates.

To increase the capacity of the heat storage material 20 that can be stored in the casing 30 and improve thermal conductivity of the stirrer 12, preferably, the stirrer 12 is thin, has a large surface area, and has a lot of blades.

The materials for the stirrer 12 and the projection 15 may be the same as the material for the casing 30, or may be different from the material for the casing 30. The stirrer 12 and the projection 15 are preferably made of a material having good thermal conductivity and in some cases, may be made of glass, ceramic, resin, or rubber. As described above, since the projection 15 is in contact with the inner face of the casing 30, the casing 30 and the projection 15 may be preferably made of any corrosion-resistant material for the projection 15 or the casing 30 as combination of material type of the projection 15 and the material type of the casing 30. In this case, for example, the projection 15 is made of a corrosion-resistant material for the projection 15. When it is attempted that crystallization of the heat storage material 20 is completed within a short time for cold storage, heat generated with crystallization of the heat storage material 20 must be radiated to the outside of the casing 30 while preventing the heat from concentrating at a particular site. For this reason, the shape and material of the stirrer 12 and the projection 15 are determined so as to exhibit good thermal conductivity.

When the stirrer 12 is light-weighted, the pressure caused by contact of the projection 15 with the inner face of the casing 30 becomes small, and a pressure fluctuation occurring due to continuous contact of the projection 15 with the inner face of the casing 30 with rotation of the stirrer 12 tends to be small. Thus, for example, given that areas found when the stirrer 12 and the projection 15 are projected onto the plane that is perpendicular to the rotating axis of the stirrer 12 in the direction that is parallel to the rotating axis are P1 and P2, respectively, P2 is preferably, 90% of P1 or less. In this case, even when the stirrer 12 is light-weighted, the area of the projection 15 is not too large, and the pressure caused by contact of the projection 15 with the inner face of the casing 30 is large. This can lead to a sufficient large pressure fluctuation to improve the efficiency of generating crystalline nucleus of the heat storage material 20. Accordingly, crystallization of the heat storage material 20 can be completed within a short time more reliably.

When the stirrer 12 starts to rotate, minute crystalline nuclei of the heat storage material 20 are generated. Due to convection caused by stirring the heat storage material 20, minute crystalline nuclei diffuse in the casing 30, and diffused minute crystalline nuclei induce generation of new crystalline nuclei. The crystalline nuclei diffused in the casing 30 each grow and then, are united, and finally, become a polycrystal. At crystallization of the heat storage material 20, phase transition heat occurs. In the vicinity of the site where phase transition heat occurs, the temperature of the heat storage material 20 increases, hampering crystallization of the heat storage material 20. Thus, to achieve rapid crystallization of the heat storage material 20, phase transition heat needs to be removed.

When crystallization of the heat storage material 20 starts, since the viscosity of the heat storage material 20 increases, rotation of the stirrer 12 stops to stop diffusion of minute crystalline nuclei. When minute crystalline nuclei do not diffuse throughout the heat storage material 20 in the casing 30, crystallization gradually proceeds and it takes a long time to complete crystallization of the heat storage material 20. To release supercooling and rapidly complete crystallization at the same time, minute crystalline nuclei generated by contact of the projection 15 with the inner face of the casing 30 with rotation of the stirrer 12 needs to be diffused throughout the heat storage material 20 within a short time by means of stirring of the heat storage material 20 and convection. To stir the whole heat storage material 20 in the casing 30 by use of the stirrer 12 to generate convention without stagnation even when the viscosity of the heat storage material 20 is relatively high, predetermined relation in size between the stirrer 12 and the casing 30 is desirably satisfied.

For example, the stirrer 12 and the projection 15 preferably include metal or alloy, the stirrer 12 is not in contact with the inner face of the casing 30 while the stirrer 12 rotates, and a sum of surface areas of the stirrer 12 and the projection 15 is 10% of the area of the inner face of the casing 30 or more. Given that the stirrer 12 and the projection 15 include metal or alloy, the sum of surface areas of the stirrer 12 and the projection 15 is 10% of the area of the inner face of the casing 30 or more, even when a sum of volumes of the stirrer 12 and the projection 15 is small relative to the volume of the heat storage material 20, phase transition heat of the heat storage material 20 can be prevented from concentrating at a particular site, and the heat can be readily radiated to the outside of the heat storage material 20. As a result, crystallization of the heat storage material 20 is easy to progress. Further, when the sum of surface areas of the stirrer 12 and the projection 15 is 10% of the area of the inner face of the casing 30 or more, the stirrer 12 and the projection 15 can have a large mass. Thus, the rotary force (inertial force) of the rotating stirrer 12 and projection 15 exceeds the viscous force of the heat storage material 20, such that the stirrer 12 and the projection 15 smoothly rotate. Accordingly, the generated crystalline nuclei effectively diffuse throughout the heat storage material 20. Therefore, even when the sum of volumes of the stirrer 12 and the projection 15 is small relative to the volume of the heat storage material 20, or the viscosity of the heat storage material 20 is relatively large, crystallization of the heat storage material 20 can be completed within a short time.

The plurality of stirrers 12 may be arranged in the casing 30. This is advantageous in terms of efficient stirring of the heat storage material 20 and convection and however, increases manufacturing costs of the heat storage apparatus 1a. For this reason, it is desired that the single stirrer 12 is disposed in the casing 30 to achieve efficient stirring of the heat storage material 20 and convection.

The surface roughness of the projection 15 may be different from the surface roughness of a remaining portion of the stirrer 12, or the surface roughness of the inner face of the casing 30 in contact with the projection 15 may be different from the surface roughness of a remaining portion of the casing 30. The face of the projection 15 or inner face of the casing 30 in contact with the projection 15 may have a relatively high surface roughness. In this case, the pressure and frictional forces that generated at contact of the projection 15 with the inner face of the casing 30 can be easily changed. A surface roughness Ra of the face of the projection 15 or inner face of the casing 30 in contact with the projection 15 is not specifically limited, and is, for example, in the range of 0.01 μm to 100 μm, preferably in the range of 0.1 μm to 100 and more preferably in the range of 1.0 μm to 100 μm. The surface roughness Ra refers to an arithmetic average roughness specified in the Japanese Industrial Standard (JIS)B 0601. Examples of the method of enhancing the surface roughness include sand-blasting of blowing microparticles onto a face to roughen the face, and wet etching of dipping a face into a chemical solution to chemically erode the face.

As the area of the projection 15 decreases, the contact pressure of the projection 15 with the inner face of the casing 30 increases. In this case, the pressure fluctuation occurring while the stirrer 12 rotates becomes large, which is effective in releasing supercooling of the heat storage material 20. On the contrary, when the contact pressure of the projection 15 with the inner face of the casing 30 is too large, excessive energy is necessary for rotation of the stirrer 12 and furthermore, the inner face of the casing 30 may be worn and the wall of the casing 30 may be perforated. Thus, in this connection, the area of the projection 15 is set to fall within a suitable range. Given that areas found when the stirrer 12 and the projection 15 are projected in the direction that is parallel to the rotating axis are P1 and P2, respectively, P2 is, for example, in the range of 0.01% to 50% of P1, preferably in the range of 0.1% to 10% of P1.

Generally, as the degree of supercooling of the heat storage material is high, supercooling of the heat storage material can be released more readily, and crystallization of the heat storage material can be performed more rapidly. However, in the case where cold is stored in the heat storage material for cooling, when the degree of supercooling of the heat storage material is high, power costs of a compressor in a refrigeration cycle for generating cold disadvantageously increase. For this reason, the degree of supercooling of the heat storage material 20 is set to, for example, 10K or less, preferably 8K or less, and more preferably 7K or less. As the degree of supercooling of the heat storage material 20 is lower, costs required to operate the compressor decrease. In this specification, the degree of supercooling refers to a difference between the solidification point of the heat storage material and the temperature of the supercooled heat storage material.

The heat storage material 20 is not specifically limited, and may be a mixture of tetrabutylammonium bromide (TBAB) and water, a mixture of tetrahydrofuran (THF) and water, a mixture of cyclopentane of water, a mixture of a substance that can form clathrate hydrate and water, hydrate other than clathrate hydrate, or simple water. The clathrate hydrate (clathrate hydrate) is a generic name of a clathrate compound in which various guest molecules enter into a molecule-scale "cage structure" of a water molecule by hydrophobic interaction. The guest molecule means a molecule stably accommodated in the "cage structure" of water molecule. The heat storage material 20 has a melting point in a temperature range suitable for cooling, a temperature range suitable for heating, or a temperature range suitable for refrigeration. The heat storage material 20 is desirably, an inexpensive material. The heat storage material 20 may contain a single type of heat storage material, or may contain two or more types of heat storage materials. The heat storage material 20 may contain gas. The heat storage material 20 containing gas may increase the amount of latent heat in the heat storage material 20.

The heat storage material 20 may contain various additives. Examples of the additives contained in the heat storage material 20 are preservatives, anticorrosives, viscosity adjusting agents, foam stabilizers, antistatic agents, defoaming agents, abrasive grains, fillers, pigments, paints, coloring agents, thickening agents, surface activating agents, fire retardants, plasticizers, lubricants, antistatic agents, heat-resistive stabilizing agents, tackifiers, catalysts, stabilizing agents, silane coupling agents, and wax. The heat storage material 20 may contain one of the additives, or any combination of two or more additives. The type and content of the additive contained in the heat storage material 20 are not specifically limited.

In the case where the heat storage material 20 is a material that can form clathrate hydrate, the heat storage material 20 can be prepared as follows. First, a predetermined amount of guest substance for forming clathrate hydrate is gradually added to pure water or ion-exchanged water in a casing while stirring the pure water or ion-exchanged water to appropriately mix the pure water or ion-exchanged water with the guest substance. As necessary, above-mentioned additive may be added to pure water or ion-exchanged water simultaneously with, before, or after addition of the guest substance and then, mixed and/or stirred. In this manner, the heat storage material 20 can be prepared. The heat storage material 20 may be also prepared by supplying pure water or ion-exchanged water to a casing containing the guest substance with above-mentioned additive in advance. The order of adding the guest substance and the additive is not specifically limited. To promote dissolution or diffusion of the guest substance or the additive, a heating step may be performed to prepare the heat storage material 20. In this case, the heating step is performed so as not to chemically decompose the guest substance or the additive.

Modifications

Figure 2A:
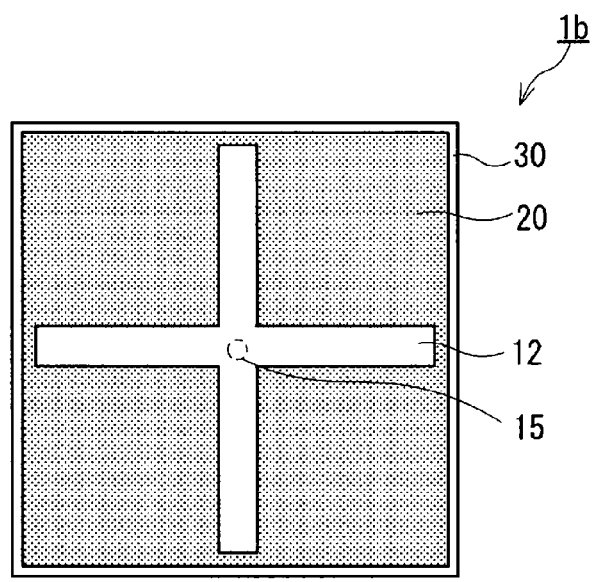
FIG. 2A is an upper view illustrating another example of the heat storage apparatus of the present disclosure.
Figure 2B:
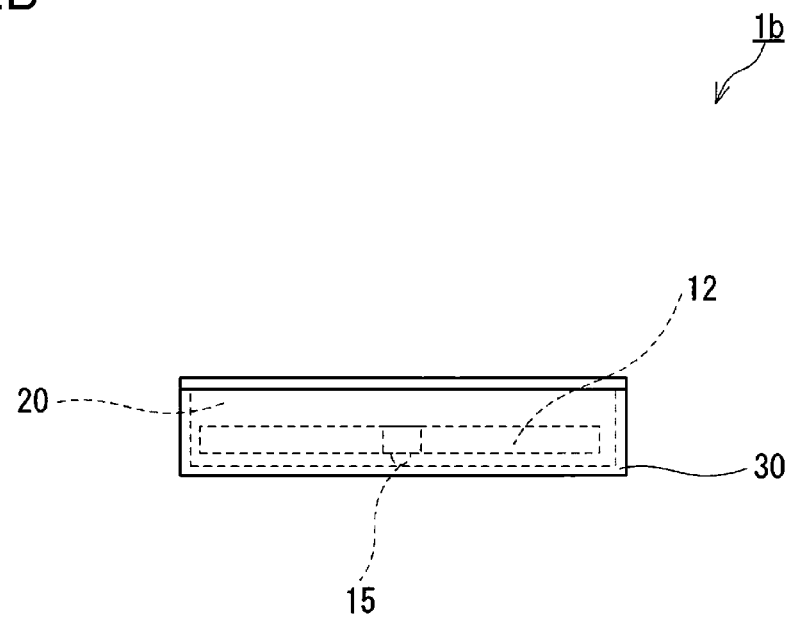
FIG. 2B is a front view illustrating the heat storage apparatus illustrated in FIG. 2A.

The heat storage apparatus 1a may be modified to a heat storage apparatus 1b illustrated in FIGS. 2A and 2B. Unless otherwise specified, the heat storage apparatus 1b and the heat storage apparatus 1a are similarly configured. The same or corresponding components of the heat storage apparatus 1b as the components of the heat storage apparatus 1a are given the same reference numerals, and detailed description thereof is omitted. Unless a technical contradiction occurs; description of the heat storage apparatus 1a is applicable to the heat storage apparatus 1b.

As illustrated in FIGS. 2A and 2B, the stirrer 12 in the heat storage apparatus 1b includes a magnetic material, is isolated from the outside of the casing 30, and rotates with a change in the magnetic field generated outside the casing 30. In this case, the change in the magnetic field generated outside the casing 30 corresponds to a physical change generated outside the casing 30. A magnetic controller (not illustrated) that generates the change in the magnetic field is disposed outside the casing 30. The magnetic controller may include a permanent magnet or a motor that rotates the permanent magnet; or may include a mechanism (coil or the like) that generates the magnetic field by electromagnetic induction. The heat storage apparatus 1b requires no mechanism that transmits a motive force generated outside the casing 30 to the stirrer 12, improving the sealing property of the casing 30. Moreover, the configuration of the heat storage apparatus 1b can be simplified to reduce manufacturing costs of the heat storage apparatus 1b.

Second Embodiment

Next, a heat storage apparatus 1c according to Second embodiment will be described. Unless otherwise specified. Second embodiment and First embodiment are similarly configured. The same or corresponding components of the heat storage apparatus 1c as the components of the heat storage apparatus 1a in First embodiment are given the same reference numerals, and detailed description thereof is omitted. Unless a technical contradiction arises, description of First embodiment and its modifications is applicable to Second embodiment.

Figure 3A:
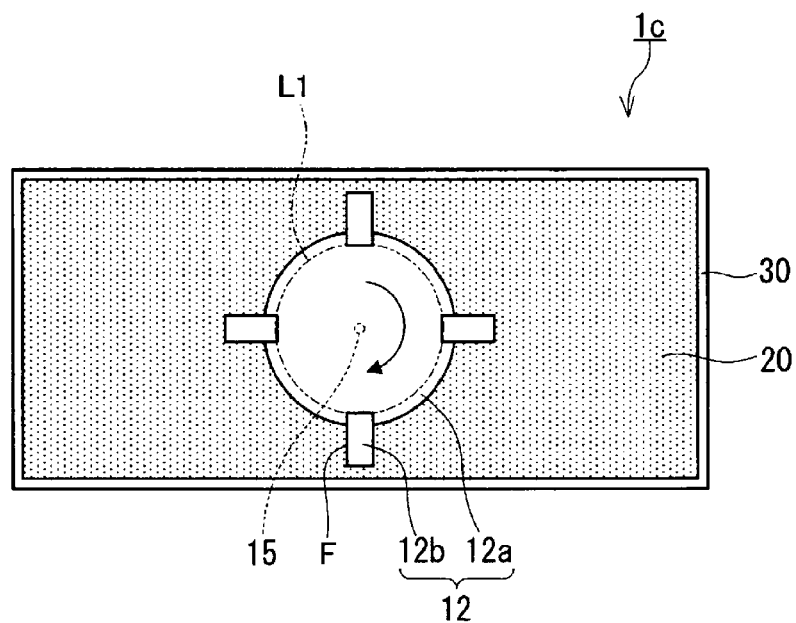
FIG. 3A is an upper view illustrating still another example of the heat storage apparatus of the present disclosure.
Figure 3B:
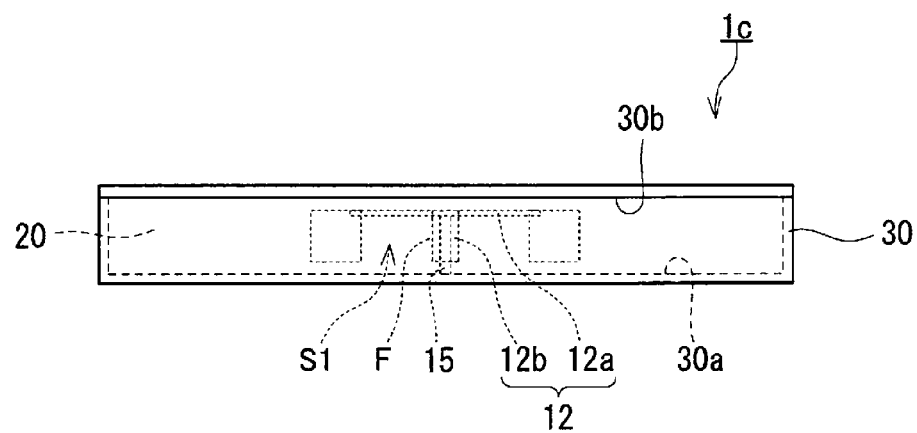
FIG. 3B is a front view illustrating the heat storage apparatus illustrated in FIG. 3A.

As illustrated in FIGS. 3A and 3B, the stirrer 12 in the heat storage apparatus 1c includes a first plate 12a and a blade 12b. The first plate 12a has the center of gravity on the rotating axis of the stirrer 12, and is disposed about the rotating axis. The blade 12b is fixed to the first plate 12a away from the center of gravity of the first plate 12a, and is thicker than the thickness of the first plate 12a in the direction that is perpendicular to a principal face of the first plate 12a. In addition, the blade 12b has a front face F that is in contact with the heat storage material 20 in the rotating direction of the stirrer 12. The heat storage apparatus 1c further includes a first space S1. The first space S1 is present between the inner face 30a of the casing 30 and the first plate 12a along the rotating axis of the stirrer 12. The first space S1 is present between a first locus L1 and the projection 15. The first locus L1 is a locus that a first end of the blade 12b, which is a portion closest to the rotating axis of the stirrer 12, follows when the stirrer 12 rotates. With rotation of the stirrer 12, the heat storage material 20 in the liquids state can circulate in the first space S1.

In the heat storage apparatus 1c, crystallization heat caused by generation of crystalline nuclei is transmitted through the first plate 12a to the outside of the casing 30. This can rapidly remove crystallization heat. In addition, since the stirrer 12 includes the blade 12b, crystalline nuclei are rapidly dispersed in the whole casing 30. Further, since the first space S1 is present between the first locus L1 and the projection 15, crystalline nuclei of the heat storage material 20 are easily dispersed from the first space S1 to outside of the first space S1, and the liquid heat storage material 20 located outside the first space S1 is easily guided into the first space S1. For this reason, crystalline nuclei generated due to continuous contact of the projection 15 with the inner face 30a of the casing 30 with rotation of the stirrer 12 are easily dispersed to the outside of the first space S1 in the state where crystallization heat occurred from generation of crystalline nuclei is radiated through the first plate 12a. Thereby, crystalline nuclei are easily dispersed to the outside of the first space S1 with a large degree of supercooling. As a result, due to the presence of crystalline nuclei dispersed outside the first space S1, crystallization of the heat storage material 20 can be completed within a short time.

As long as the first plate 12a has the center of gravity on the rotating axis of the stirrer 12, the shape of the first plate 12a is not specifically limited, and may be disc plate-like, elliptical plate-like, or polygonal plate-like such as rectangular plate-like. The first plate 12a has a thickness of, for example, in the range of 0.5 to 2.0 mm. In this case, the first plate 12a has suitable strength, and receives a small resistance from the heat storage material 20 while the stirrer 12 rotates. As long as the first plate 12a is disposed about the rotating axis of the stirrer 12, the first plate 12a may be disposed at any position. For example, the first plate 12a extends perpendicularly to the rotating axis of the stirrer 12. In this case, the first plate 12a receives a small resistance from the heat storage material 20 while the stirrer 12 rotates, which means that a motive force required to rotate the stirrer 12 is small.

The first plate 12a is typically made of a material having good thermal conductivity. The first plate 12a is made of, for example, a material having a thermal conductivity in the range of 10 to 190 W/(mK) or more at 20 degrees centigrade. The first plate 12a is made of metal or alloy such as aluminum, copper, and stainless steel.

The shape of the blade 12b is not specifically limited, and may be rod-like, plate-like, or blade-like. Desirably, the blade 12b is shaped to effectively stir the heat storage material 20 with rotation of the stirrer 12. The blade 12b may be formed of a rectangular thin plate or bent rectangular thin plate such as a heat transfer fin. To increase the volume of the heat storage material 20 and improve thermal conductivity, it is desired that the blade 12b has a small thickness and a large surface area. The number of the blade 12b of the stirrer 12 (four in FIG. 3A) is not specifically limited, and is determined depending on the stirring efficiency of the heat storage material 20, thermal conductivity of the blade 12b, and manufacturing costs. When a plurality of blades 12b of the stirrer 12 are provided, the plurality of blade 12b are arranged about the rotating axis of the stirrer 12 at regular intervals.

The material for the blade 12b may be the same as the material for the casing 30, or may be different from the material for the casing 30. Preferably, the blade 12b is made of a material having good thermal conductivity. The blade 12b may be made of glass, ceramic, resin, or rubber. The blade 12b may be made of a combination of two or more types of materials, such as a combination of a magnetic material and a non-magnetic material. When the material for the first plate 12a is different from the material for the blade 12b, it is desired that the combination of the material for the first plate 12a and the material for the blade 12b can suppress corrosion at the boundary between the first plate 12a and the blade 12b.

To complete crystallization of the heat storage material 20 within a short time, it is effective to rapidly remove crystallization heat. For this reason, the shape and material of the blade 12b are desirably determined based on thermal conductivity.

The distance between the rotating axis of the stirrer 12 and the first end of the stirrer 12 is in the range of 40% to 100% of the distance between the end of the first plate 12a, which is furthest from the rotating axis of the stirrer 12, and the rotating axis. Accordingly, the first space S1 can have a desirable capacity in terms of circulation of the heat storage material 20 with rotation of the stirrer 12.

The shortest distance between the inner face 30a of the casing 30 and the first plate 12a is, for example, 2 to 100 times of the thickness of the first plate 12a. Accordingly, the first space S1 can have a desirable capacity in terms of circulation of the heat storage material 20 with rotation of the stirrer 12.

As illustrated in FIG. 3B, the casing 30 has an opposed face 30b that faces the inner face 30a of the casing 30. The distance between the inner face 30a of the casing 30 and the first plate 12a along the rotating axis of the stirrer 12 is larger than the distance between the opposed face 30b of the casing 30 and the first plate 12a. In this case, the first space S1 can have a desirable volume in terms of circulation of the heat storage material 20 with rotation of the stirrer 12. In addition, since the distance between the opposed face 30b of the casing 30 and the first plate 12a, crystallization heat received by the first plate 12a can be readily radiated to the outside of the casing 30.

In the heat storage apparatus 1c, for example, the stirrer 12 is located at the center of the inner face 30a of the casing 30. The stirrer 12 may be disposed away from the center of the inner face 30a of the casing 30.

Modifications

The heat storage apparatus 1c may be modified in various terms. For example, as illustrated in FIGS. 4A to 10B, the heat storage apparatus 1c may be modified to the heat storage apparatuses 1d to 1j. Unless otherwise specified, the heat storage apparatus 1d to 1j and the heat storage apparatus 1c are similarly configured. The same or corresponding components of the heat storage apparatuses 1d to 1j as the components of the heat storage apparatus 1c are given the same reference numerals, and detailed description thereof is omitted.

Figure 4A:
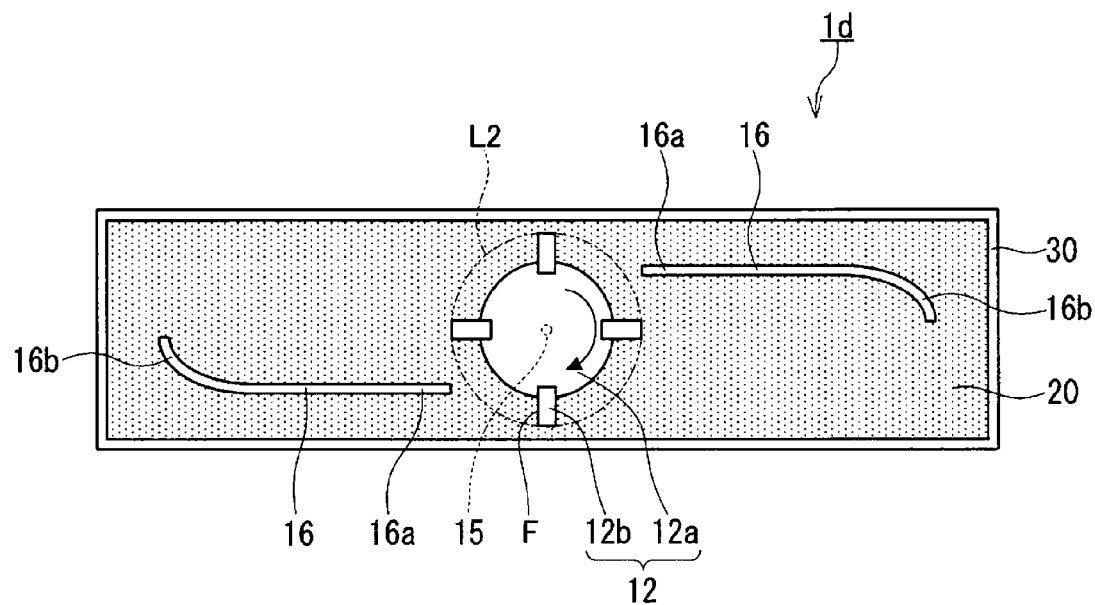
FIG. 4A is an upper view illustrating still another example of the heat storage apparatus of the present disclosure.
Figure 4B:
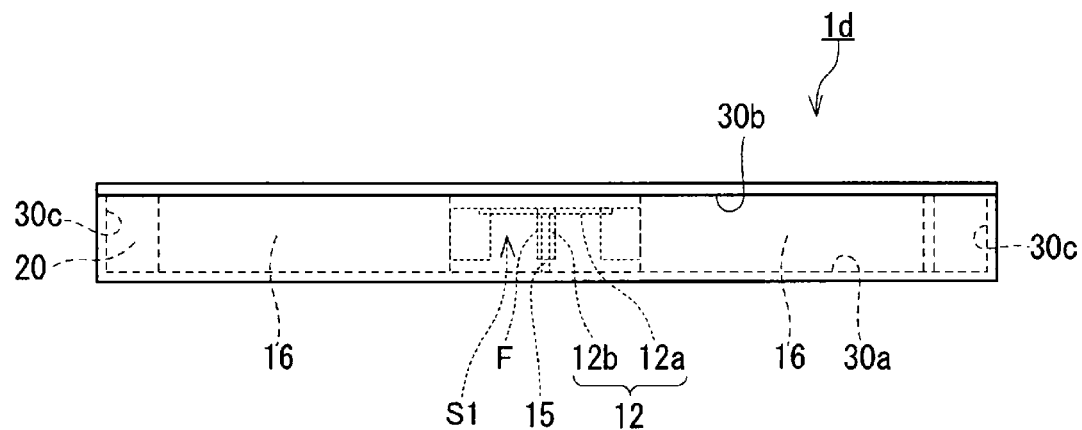
FIG. 4B is a front view illustrating the heat storage apparatus illustrated in FIG. 4A.

As illustrated in FIGS. 4A and 4B, the heat storage apparatus 1d further includes current-adjusting plates 16. The current-adjusting plates 16 are disposed in the casing 30, are disposed on the outer side of a second locus L2 in the direction that is perpendicular to the rotating axis of the stirrer 12. The second locus L2 is a locus that a second end of the stirrer 12, which is a portion furthest from the rotating axis of the stirrer 12, follows when the stirrer 12 rotates. The current-adjusting plates 16 each have a proximal portion 16a and a distal portion 16b. The distal portion 16b is located further from the second locus L2 than the proximal portion 16a.

In the heat storage apparatus 1d, when the stirrer 12 is rotated to store cold in the heat storage material 20, the heat storage material 20 that is sent from the first space S1 by means of the stirrer 12 and flows in the direction of rotation of the stirrer 12 is intercepted by the current-adjusting plates 16. Then, the heat storage material 20 flows along the current-adjusting plates 16 away from the second locus L2. Due to convection of crystalline nuclei with such flow of the heat storage material 20, crystalline nuclei are supplied to sites remote from the second locus L2 in the casing 30. For this reason, crystallization of the heat storage material 20 can be readily completed within a short time. Due to the function of the current-adjusting plates 16, a portion of the heat storage material 20 supplied to the sites remote from the second locus L2 in the casing 30 flows along the inner side face of the casing 30, and is guided to the first space S1 by means of the stirrer 12. As described above, the heat storage material 20 is easily circulated throughout the casing 30. As a result, even when the internal space of the casing 30 is large relative to the stirrer 12, crystalline nuclei tends to be dispersed to sites remote from the second locus L2 in the casing 30, crystallization of the heat storage material 20 can be readily completed within a short time.

The distal portion 16b of the current-adjusting plate 16 is curved, for example, in the rotating direction of the stirrer 12. Thereby, the heat storage material 20 flows along the distal portion 16b away from the second locus L2 in the rotating direction of the stirrer 12. Thus, due to the function of the current-adjusting plates 16, a portion of the heat storage material 20 supplied to sites remote from the second locus L2 in the casing 30 readily flows toward the first space S1. Accordingly, the heat storage material 20 is readily circulated in the first space S1.

The heat storage apparatus 1d includes the pair of current-adjusting plates 16. For example, the stirrer 12 is disposed between the pair of current-adjusting plates 16.

In the heat storage apparatus 1d, the casing 30 typically has an inner side face 30c. The inner side face 30c extends from an end of the inner face 30a of the casing 30 along the rotating axis of the stirrer 12, and surrounds the stirrer 12. The current-adjusting plates 16 are located away from the inner side face 30c. The shortest distance between the second locus L2 and the current-adjusting plate 16 is smaller than the shortest distance between the inner side face 30c of the casing 30 and the current-adjusting plate 16. In this case, since the shortest distance between the second locus L2 and the current-adjusting plate 16 is small, the flow resistance of the heat storage material 20 is small in the gap between the stirrer 12 and the current-adjusting plate 16. Thus, the heat storage material sent from the first space S1 by means of the stirrer 12 readily flows along the current-adjusting plates 16 and into the gap between the inner side face 30c of the casing 30 and the current-adjusting plates 16. Accordingly, the heat storage material 20 flows along the current-adjusting plate 16 and the inner side face 30c of the casing 30, and is guided to the first space S1 by means of the stirrer 12. In this manner, the heat storage material 20 can be readily circulated throughout the casing 30.

In the heat storage apparatus 1d, the casing 30 has typically an opposed face 30b that faces the inner face 30a of the casing. The current-adjusting plates 16 are typically made of a material having a higher thermal conductivity than the thermal conductivity of the heat storage material 20. In addition, the current-adjusting plates 16 are in contact with the inner face 30a of the casing 30 and the opposed face 30b. For this reason, crystallization heat generated by growth of crystals of the heat storage material 20 is readily radiated to the outside of the casing 30, crystallization of the heat storage material 20 can be readily completed within a short time.

For example, the current-adjusting plates 16 are made of a material having a thermal conductivity of 15 W/(mK) or more at 20 degrees centigrade. The current-adjusting plates 16 are made of metal or alloy such as aluminum, copper, and stainless steel.

In the heat storage apparatus 1d, the inner face 30a of the casing 30 is, for example, a rectangle having a long side that is twice of a short side or more in length. In this case, the proximal portions 16a of the current-adjusting plates 16 extend along the long sides of the inner face 30a. Accordingly, the heat storage material including crystalline nuclei are readily supplied to corners of the casing 30, and crystallization of the heat storage material can be readily completed within a short time.

Figure 5A:
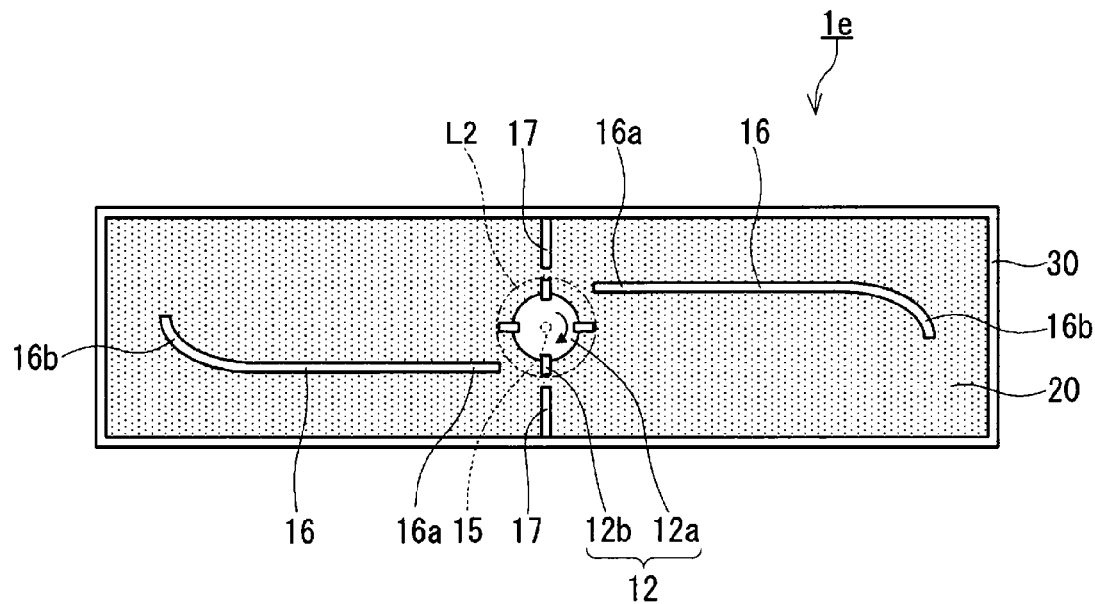
FIG. 5A is an upper view illustrating still another example of the heat storage apparatus of the present disclosure.
Figure 5B:
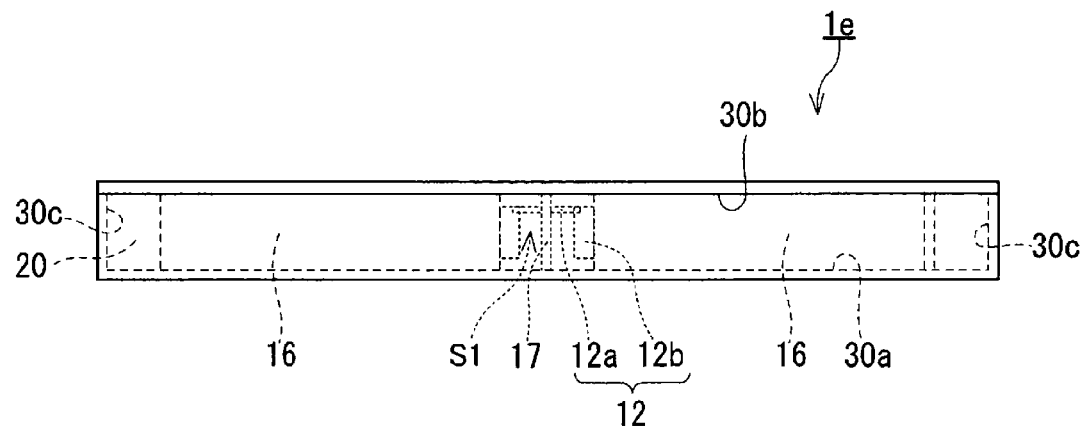
FIG. 5B is a front view illustrating the heat storage apparatus illustrated in FIG. 5A.

Unless otherwise specified, the heat storage apparatus 1e and the heat storage apparatus 1d are similarly configured. As illustrated in FIGS. 5A and 5B, the heat storage apparatus 1e includes a pair of baffle plates 17 in addition to the pair of current-adjusting plate 16. The pair of baffle plates 17 each has a first end and a second end. The first ends of the baffle plates 17 are located near the second locus L2, and the second ends of the baffle plates 17 are in contact with the inner side face 30c of the casing 30. The pair of current-adjusting plates 16 and the pair of baffle plates 17 are alternately disposed in the rotating direction of the stirrer 12. In the heat storage apparatus 1e, for example, the stirrer 12 is located at the center of the inner face 30a.

Figure 6A:
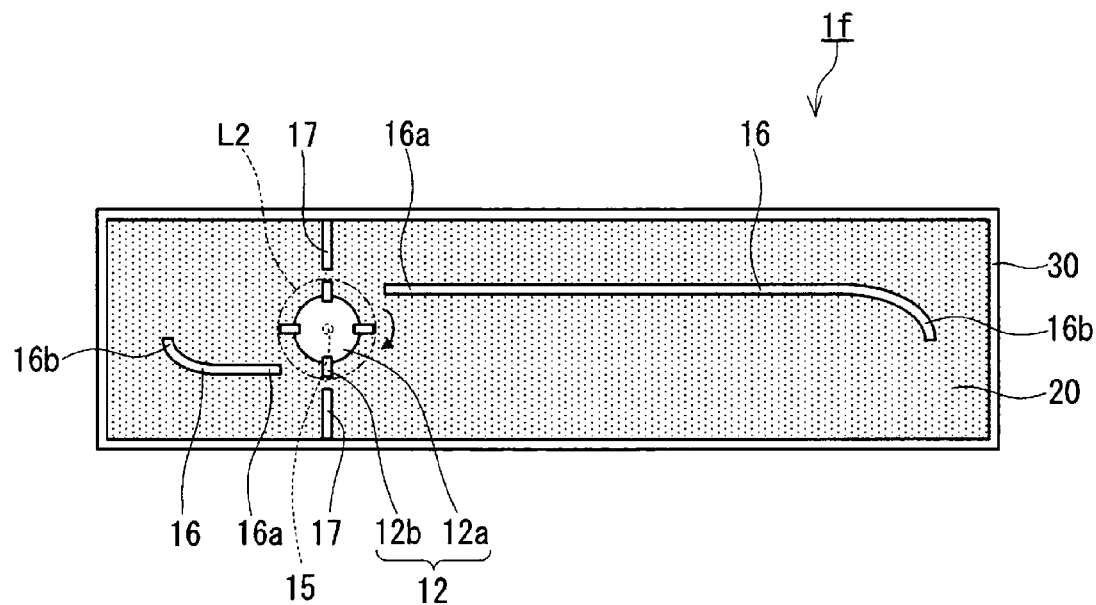
FIG. 6A is an upper view illustrating still another example of the heat storage apparatus of the present disclosure.
Figure 6B:
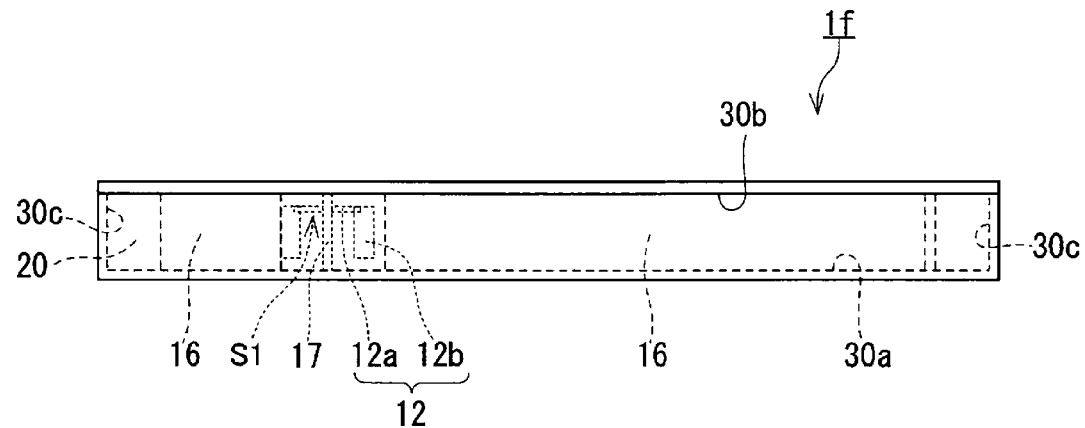
FIG. 6B is a front view illustrating the heat storage apparatus illustrated in FIG. 6A.

Unless otherwise specified, the heat storage apparatus 1f and the heat storage apparatus 1e are similarly configured. As illustrated in FIGS. 6A and 6B, in the heat storage apparatus 1f, the stirrer 12 is offset toward one of the pair of short sides of the inner face 30a. In the direction that is parallel to the long sides of the inner face 30a, the current-adjusting plate 16 disposed between one of the pair of short sides of the inner face 30a and the stirrer 12 is smaller than the current-adjusting plate 16 disposed between the other of the pair of short sides of the inner face 30a and the stirrer 12.

The heat storage apparatus 1d has the inner face 30a of the casing 30 that is a rectangle having a long side that is twice of a short side or more in length, a square, or a circle, and may include a plurality of radially arranged current-adjusting plate 16. In this case, when the aspect ratio of the inner face 30a of the casing 30, due to the plurality of radially arranged current-adjusting plate 16, the heat storage material including crystalline nuclei is readily supplied to sites remote from the second locus L2 throughout the casing 30. For this reason, crystallization of the heat storage material can be readily completed within a short time.

Figure 7A:
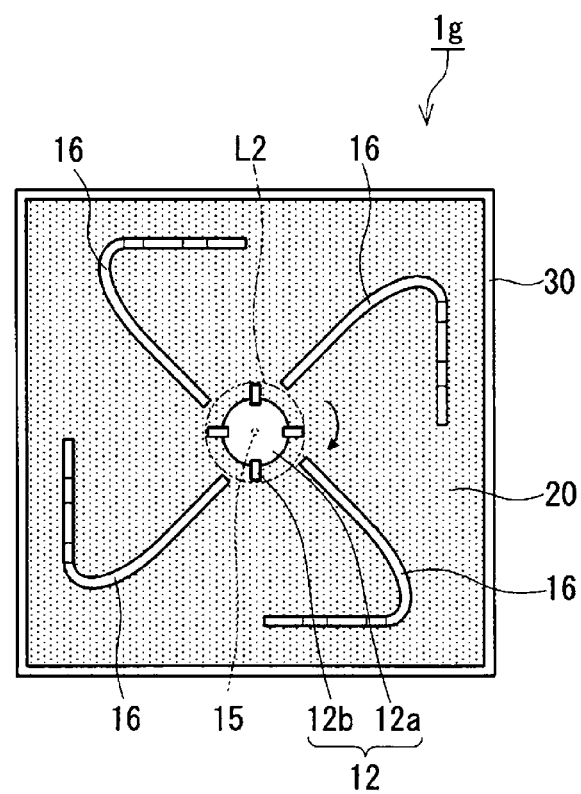
FIG. 7A is an upper view illustrating still another example of the heat storage apparatus of the present disclosure.
Figure 7B:
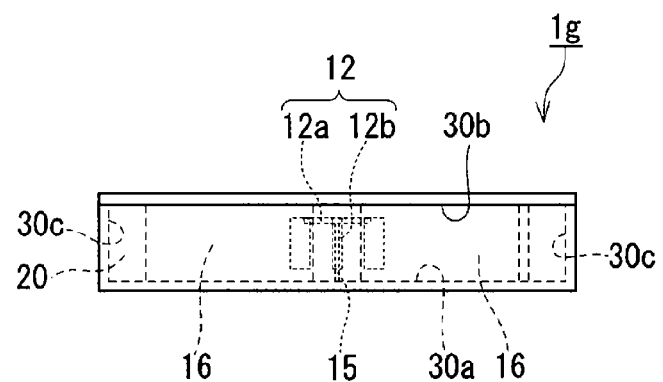
FIG. 7B is a front view illustrating the heat storage apparatus illustrated in FIG. 7A.

Unless otherwise specified, the heat storage apparatus 1g and the heat storage apparatus 1d are similarly configured. As illustrated in FIGS. 7A and 7B, in the heat storage apparatus 1g, the inner face 30a of the casing 30 is square. The heat storage apparatus 1g includes a plurality of (four in FIG. 7A) radially arranged current-adjusting plates 16. In FIG. 7B, for convenience of description, some current-adjusting plates 16 are omitted. The current-adjusting plates 16 extend from the vicinity of the second locus L2 along a diagonal line of the inner face 30a of the casing 30, and are curved in the rotating direction of the stirrer 12 in the vicinity of the inner side face 30c of the casing 30, and extend along the inner side face 30c. The current-adjusting plates 16 each have a slit in the portion extending along the inner side face 30c.

Figure 8A:
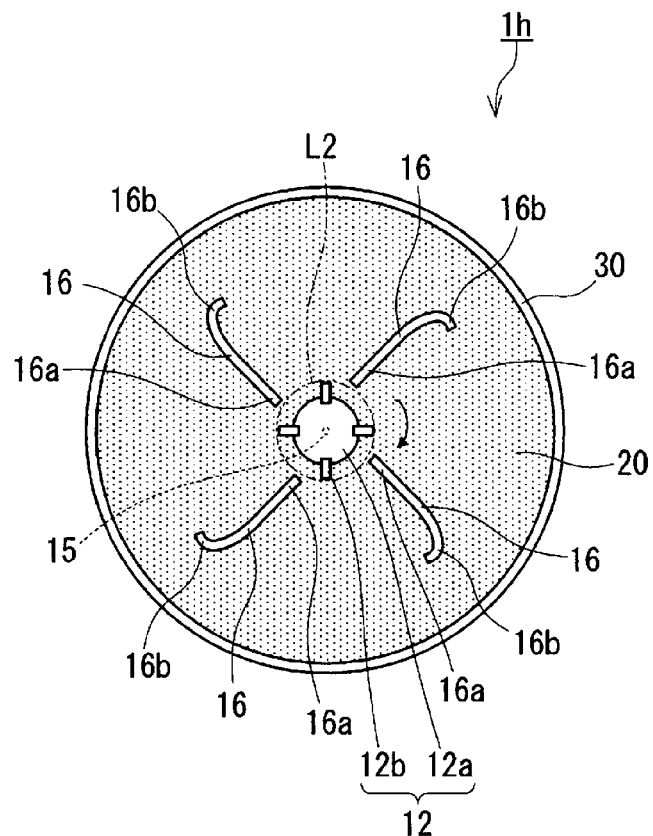
FIG. 8A is an upper view illustrating still another example of the heat storage apparatus of the present disclosure.
Figure 8B:
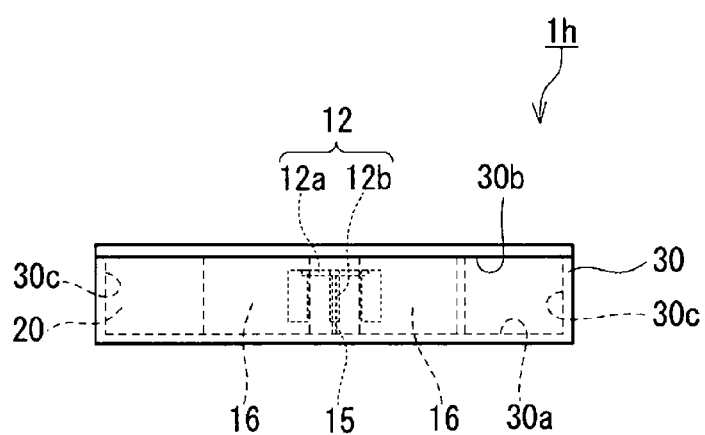
FIG. 8B is a front view illustrating the heat storage apparatus illustrated in FIG. 8A.

Unless otherwise specified, the heat storage apparatus 1h and the heat storage apparatus 1d are similarly configured. As illustrated in FIGS. 8A and 8B, in the heat storage apparatus 1h, the inner face 30a of the casing 30 is circular. The heat storage apparatus 1h includes a plurality of (four in FIG. 8A) radially arranged current-adjusting plates 16. In FIG. 8B, for convenience of description, some current-adjusting plates 16 are omitted.

Figure 9A:
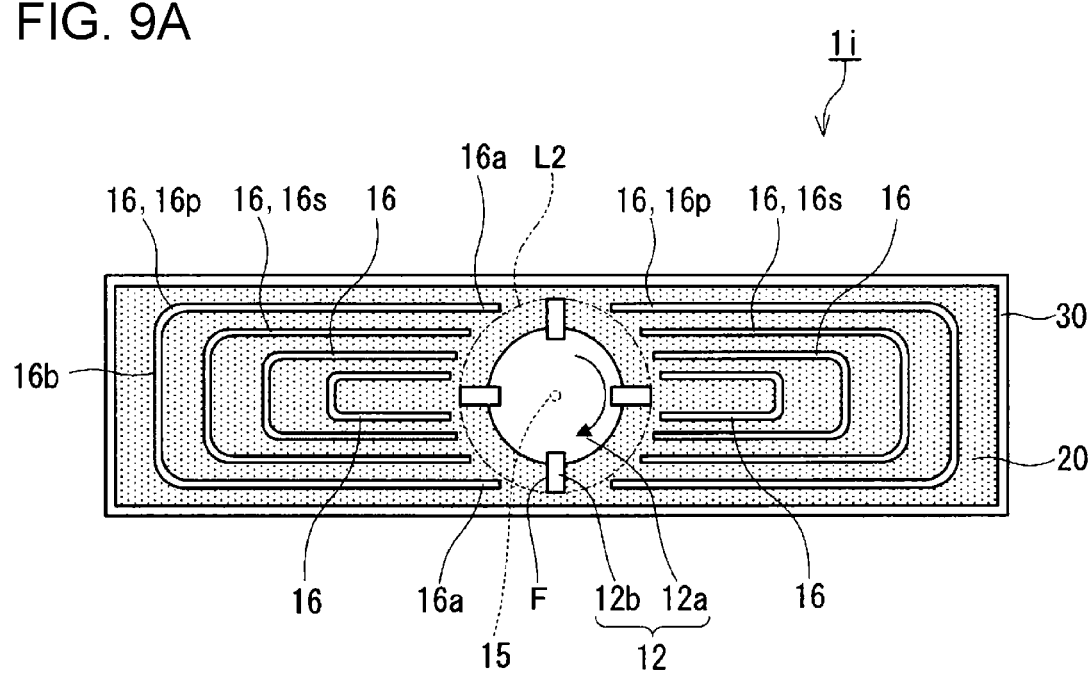
FIG. 9A is an upper view illustrating still another example of the heat storage apparatus of the present disclosure.
Figure 9B:
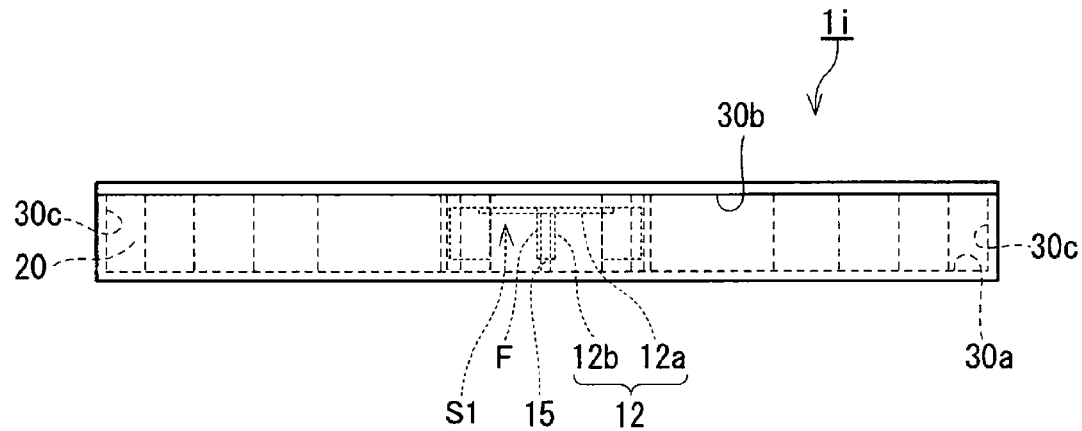
FIG. 9B is a front view illustrating the heat storage apparatus illustrated in FIG. 9A.

Unless otherwise specified, the heat storage apparatus 1i and the heat storage apparatus 1d are similarly configured. As illustrated in FIGS. 9A and 9B, in the heat storage apparatus 1i, the current-adjusting plates 16 each are U-shaped to be opened to the second locus L2, and curved in the distal portion 16b. The heat storage material 20 that is sent from the first space S1 by means of the stirrer 12 flows along the current-adjusting plates 16 and is away from the second locus L2, and the heat storage material located in the vicinity of the distal portion 16b flows along the current-adjusting plates 16 and comes closer to the second locus L2. Accordingly, the heat storage material 20 is readily circulated between the first space S1 and the site near the distal portion 16b. Further, since the current-adjusting plates 16 having good thermal conductivity are densely arranged in the heat storage material 20, crystallization heat can be readily removed. Therefore, crystallization of the heat storage material 20 can be completed within a short time.

The heat storage apparatus 1i includes the plurality of current-adjusting plates 16. The plurality of current-adjusting plates 16 has, for example, a first current-adjusting plate 16p and a second current-adjusting plate 16s. The second current-adjusting plate 16s is disposed inner from the first current-adjusting plate 16p. In this case, the heat storage apparatus 1i has a U-shaped flow path between the first current-adjusting plate 16p and the second current-adjusting plate 16s.

The heat storage apparatus 1i includes, for example, at least a pair of current-adjusting plates 16, and the pair of current-adjusting plates 16 are opened to opposite sides. The stirrer 12 is disposed between the pair of current-adjusting plates 16.

Figure 10A:
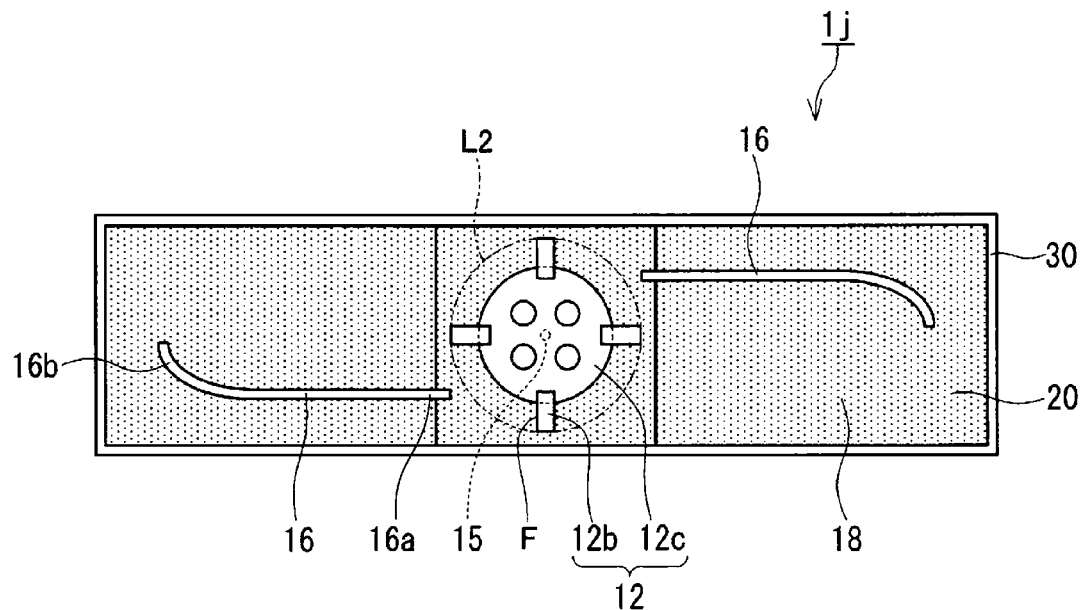
FIG. 10A is an upper view illustrating still another example of the heat storage apparatus of the present disclosure.
Figure 10B:
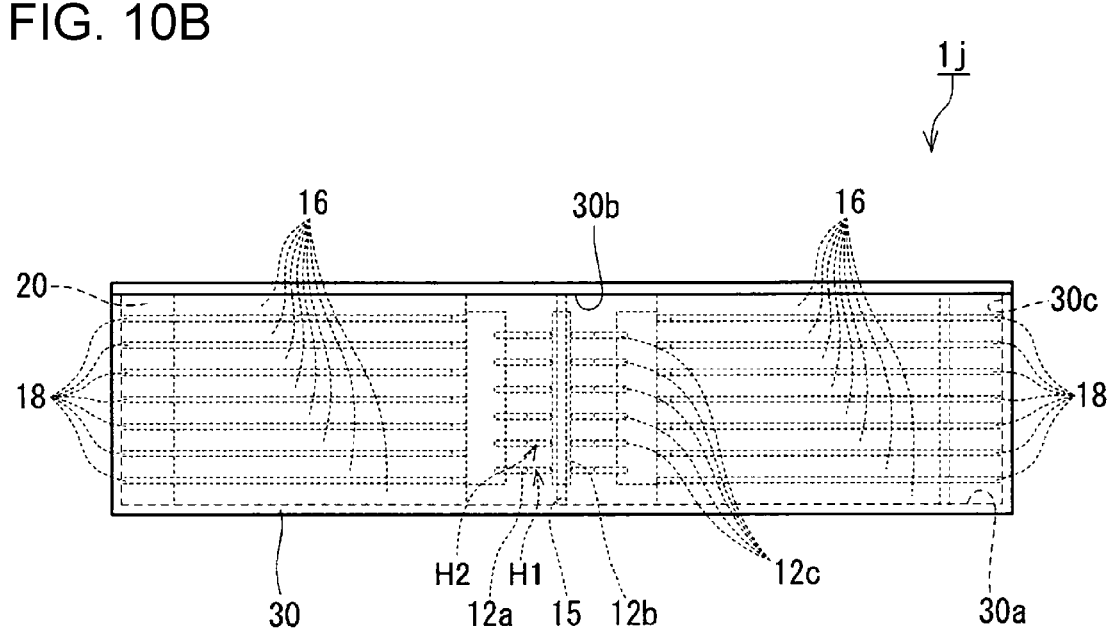
FIG. 10B is a front view illustrating the heat storage apparatus illustrated in FIG. 10A.

Unless otherwise specified, the heat storage apparatus 1j and the heat storage apparatus 1d are similarly configured. As illustrated in FIGS. 10A and 10B, in the heat storage apparatus 1j, casing 30 has an opposed face 30b that faces the inner face 30a of the casing 30. The stirrer 12 further includes a second plate 12c. The second plate 12c has the center of gravity on the rotating axis of the stirrer 12, and is disposed about the rotating axis between the opposed face 30b and the first plate 12a along the rotating axis of the stirrer 12. The first plate 12a has a first through hole H1. The second plate 12c has a second through hole H2.

In the heat storage apparatus 1j, since crystallization heat occurred by generation of crystalline nuclei is transmitted to the outside of the casing 30 through the first plate 12a as well as the second plate 12c, even when the distance between the inner face 30a of the casing 30 and the opposed face 30b of the casing 30 is relatively large, crystallization heat can be rapidly removed. In addition, a portion of crystalline nuclei generated due to continuous contact of the projection 15 with the inner face 30a of the casing 30 with rotation of the stirrer 12 tends to move along the rotating axis of the stirrer 12 through the first through hole H1, in some cases, the second through hole H2. Accordingly, when the distance between the inner face 30a of the casing 30 and the opposed face 30b of the casing 30 is relatively large, also between the opposed face 30b of the casing 30 and the first plate 12a along the rotating axis of the stirrer 12, crystalline nuclei are readily dispersed throughout the casing 30. As a result, crystallization of the heat storage material 20 can be readily completed within a short time.

The shape and material of the second plate 12c is the same as the shape and material of the first plate 12a.

In the heat storage apparatus 1j, the blade 12b is fixed to the first plate 12a as well as the second plate 12c. The blade 12b is larger than the distance between the first plate 12a and the second plate 12c along the rotating axis of the stirrer 12.

In the heat storage apparatus 1j, the stirrer 12 includes a plurality of (five in FIG. 10B) second plates 12c. In this case, the first plate 12a and the plurality of second plate 12c are disposed at regular intervals along the rotating axis of the stirrer 12. For example, the first plate 12a and the plurality of second plates 12c are disposed at regular intervals along the rotating axis of the stirrer 12.

The heat storage apparatus 1j further includes a partition 18. The partition 18 is located on the other side of the second locus L2, and partitions the internal space of the casing 30 along the rotating axis of the stirrer 12. Accordingly, in a space located closer to the opposed face 30b of the casing 30 than the first plate 12a along the rotating axis of the stirrer 12, convection of crystalline nuclei that moves through the first through hole H1, in some cases, second through hole H2 along the rotating axis of the stirrer 12 occurs. This promotes crystalline nuclei to diffuse throughout the casing 30. Therefore, crystallization of the heat storage material can be readily completed within a short time.

The material for the partition 18 is the same as the material for the casing 30.

The heat storage apparatus 1j further includes a plurality of current-adjusting plates 16. The current-adjusting plates 16 are disposed in respective spaces partitioned with the partition 18. The current-adjusting plates 16 each has a proximal portion 16a and a distal portion 16b. The distal portion 16b is further from the second locus L2 than the proximal portion 16a. In this case, in each space partitioned with the partition 18, crystalline nuclei are readily supported to sites remote from the second locus L2, crystallization of the heat storage material 20 can be completed within a short time.

EXAMPLES

The heat storage apparatus of the present disclosure will be described below in more derail using Examples. However, the heat storage apparatus of the present disclosure is not limited to the Examples.

Example 1

A heat storage apparatus in Example 1 as illustrated in FIGS. 1A and 1B was produced. First, a thin rectangular parallelepiped-shaped casing (internal dimension: length 30 mm×width 30 mm×height 3.0 mm) was prepared. One face of the casing was made of glass, and the other face of the casing was made of stainless steel. A through hole was formed in a portion of a wall of the casing. The stirrer (diameter: 29 mm, height: 2.0 mm) was prepared. A projection having a height of 0.4 mm (hemisphere having a radius of 0.4 mm) was attached to the center of the stirrer, and a rotating shaft was attached to the center of the stirrer. As illustrated in FIG. 1B, the stirrer was disposed in the casing such that the projection located at the rotating center of the stirrer was in contact with the bottom face of the casing, and that the rotating shaft extended from the inside of the casing to the outside of the casing through the through hole. The rotating shaft was coupled to a motor. The casing was filled with 40 percent by mass of TBAB solution as the heat storage material. The 40 percent by mass of TBAB solution had a melting point of 12 degrees centigrade. In this manner, the heat storage apparatus in Example 1 was produced.

Operating Example 1

The casing in the heat storage apparatus in Example 1 was adjusted to 50 degrees centigrade and then, water-cooled. At the instant that the temperature of the casing reached 7 degrees centigrade, a motor was activated to rotate the rotating shaft and the stirrer. The rotation speed of the rotating shaft and the stirrer was set to 600 rpm (revolutions per minute). Then, the state of the heat storage material in the casing was visually monitored while measuring the time elapsed from start of rotation of the stirrer. As time elapsed from start of rotation, the viscosity of the heat storage material increased. When the viscous force of the heat storage material exceeded the driving force of rotation of the rotating shaft, the stirrer stopped. Since too large driving force of the rotating shaft could destroy crystals, the driving force of the rotating shaft was set low so as to stably stir the heat storage material in consideration of the viscosity of the heat storage material. We supposed that, at stop of the stirrer, crystalline nuclei had been diffused throughout the casing, and crystalline nuclei were ready to grow. Since it took time to remove phase transition heat, the time when heat removal was completed was defined as crystallization of the heat storage material. At change from liquid phase to solid phase, 40 percent by mass of TBAB solution increases in density, and decreases in volume. Accordingly, when heat removal was completed, the volume of the heat storage material contracted. For this reason, after a short time from stop of the stirrer, minute cavities were formed in crystals of the heat storage material. At the instant that sufficient minute cavities were formed in the heat storage material, it was evaluated that crystallization of the heat storage material was completed. After an elapse of 20 seconds from start of rotation of the stirrer, the stirrer stopped. After an elapse of 60 seconds from start of rotation of the stirrer, crystallization of the heat storage material was completed. Time from start of rotation of the stirrer to stop of rotation of the stirrer was defined as rotation time, and time from start of rotation of the stirrer to completion of crystallization of the heat storage material was defined as crystallization completion time. Table 1 illustrates evaluation results of Operating example 1.

Here, rotation time evaluation, crystallization completion time evaluation, and overall evaluation were made according to following standards.

(Evaluation Standards of Rotation Ttime)

Rotation time less than 1 minute: A

Rotation time of 1 minute or more and less than 10 minutes: B

After elapse of 10 minutes from start of rotation, stirrer did not stop: C (Evaluation Standards of Crystallization Completion Time)

Crystallization completion time of 1 minute or less: A

Crystallization completion time of 1 minute to 10 minutes: B

After elapse of 10 minutes from start of rotation, crystallization of the heat storage material was not completed: C (Overall Evaluation)

Both of rotation time and crystallization completion time are evaluated as A:A

At east one of rotation time and crystallization completion time is evaluated as B:B At least one of rotation time and crystallization completion time is evaluated as C:C Comparative Example 1

Figure 11A:
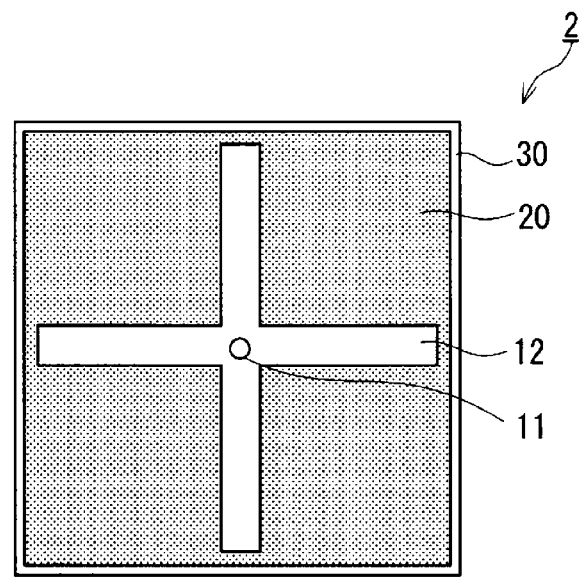
FIG. 11A is an upper view illustrating a heat storage apparatus in Comparative example 1.
Figure 11B:
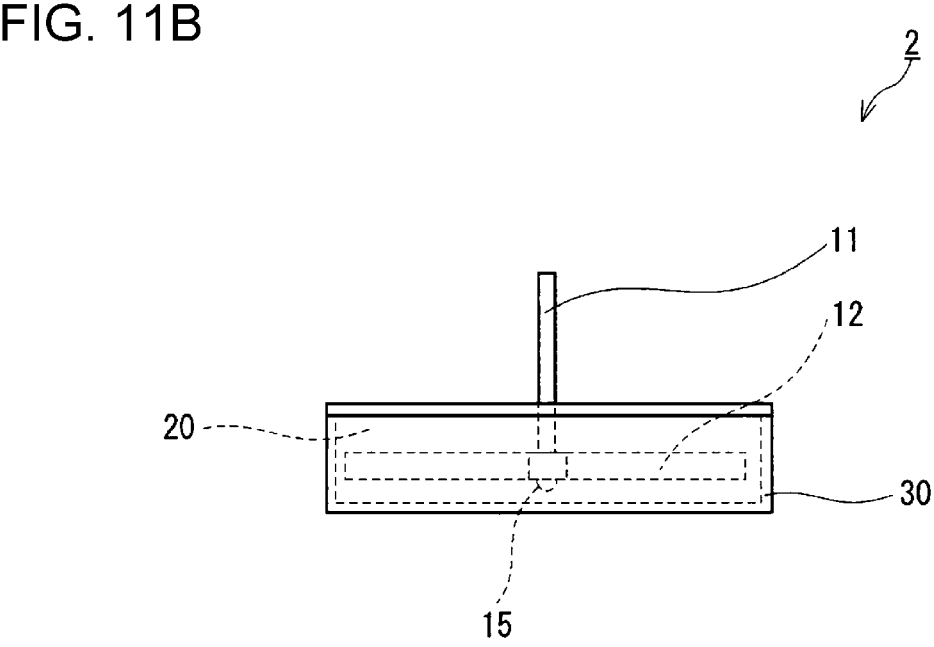
FIG. 11B is a front view illustrating the heat storage apparatus illustrated in FIG. 11A.

Next, as illustrated in FIGS. 11A and 11B, a heat storage apparatus in Comparative example 1 was produced in a similar manner to Example 1 except that the stirrer was disposed in the casing such that the projection is not in contact with the bottom face of the casing. The temperature of the heat storage apparatus in Comparative example 1 was adjusted to 50 degrees centigrade and then, the casing was water-cooled. At the instant that the temperature of the casing reached 7 degrees centigrade, a motor was activated to rotate the rotating shaft, the stirrer, and the projection. After an elapse of 10 minutes from start of rotation, the stirrer did not stop, and the heat storage material was not crystallized. In the case where the projection is not in contact with the inner face of the casing while the stirrer rotates, a pressure fluctuation in the heat storage material does not occur over time. Probably, for this reason, the heat storage material was not crystallized. Table 1 indicates evaluation results of Comparative example 1.

Example 2

The heat storage apparatus in Example 2 as illustrated in FIGS. 2A and 2B was produced. A casing in the heat storage apparatus in Example 2 was configured in the same manner as the casing in the heat storage apparatus in Example 1 except that there is no through hole. The internal dimension of the casing had length 30 mm×width 30 mm×height 3.0 mm. A stirrer (diameter: 29 mm, height: 2.0 mm) made of a magnetic material was prepared. A projection having a height 0.4 mm (hemisphere having a radius of 0.4 mm) was attached to the center of the stirrer. The stirrer was disposed in the casing. 40 percent by mass of TBAB solution was filled as the heat storage material. The stirrer can be rotated by operating a controller of a magnetic stirrer in the state where the casing was placed on a control board including the controller. In this manner, the heat storage apparatus in Example 2 was produced.

Operating Example 2

The temperature of the heat storage apparatus in Example 2 was adjusted to 50 degrees centigrade and then, the casing was water-cooled. When the temperature of the casing reached 7 degrees centigrade, the stirrer was rotated by operating the controller of the magnetic stirrer. The rotation speed of the stirrer was set to 600 rpm (revolutions per minute). During rotation of the stirrer, the projection was in contact with the bottom face of the casing. The state of the heat storage material in the casing was visually monitored while measuring time elapsed from start of rotation of the stirrer. After an elapse of 20 seconds from start of rotation of the stirrer, the stirrer stopped. After an elapse of 60 seconds from start of rotation of the stirrer, crystallization of the heat storage material was completed. Table 1 indicates evaluation results of Operating example 2.

Operating Example 3

The heat storage apparatus in Example 2 was operated in a similar manner to Operating example 2 except that the rotation speed of the stirrer was set to 300 rpm and the stirrer was rotated for 5 seconds and then, the rotation speed of the stirrer was changed to 600. After an elapse of 5 seconds from the change to 600 rpm, the stirrer stopped. In other words, after an elapse of 10 seconds from start of rotation of the stirrer, stirrer. After an elapse of 50 seconds from start of rotation of the stirrer, crystallization of the heat storage material was completed. Table 1 indicates evaluation results of Operating example 3.

In Operating example 2, it was supposed that, since the rotation speed of the stirrer was made 600 rpm constant, a large lift acted on the initial rotating period of the stirrer to reduce a load on the inner face of the casing that is in contact with the projection. For this reason, a pressure fluctuation at the contact portion between the inner face of the casing and the projection was small to decrease the generation speed of crystalline nucleus, resulting in that the crystallization completion time in Operating example 2 was longer than the crystallization completion time in Operating example 3.

Operating Example 4

The heat storage apparatus in Example 2 was operated in a similar manner to Operating example 2 except that the rotation speed of the stirrer was set to 400 rpm. After an elapse of 17 seconds from start of rotation of the stirrer, the stirrer stopped. After an elapse of 58 seconds from start of rotation of the stirrer, crystallization of the heat storage material was completed.

Example 3

The heat storage apparatus in Example 3 was produced in the same manner as in Example 2 except that the casing had the internal dimension of length 60 mm×width 60 mm×height 3.0 mm. The clearance between the inner face of the casing and the stirrer in the direction that is parallel to the bottom face of the casing was 15.5 mm.

Operating Example 5

Figure 12:
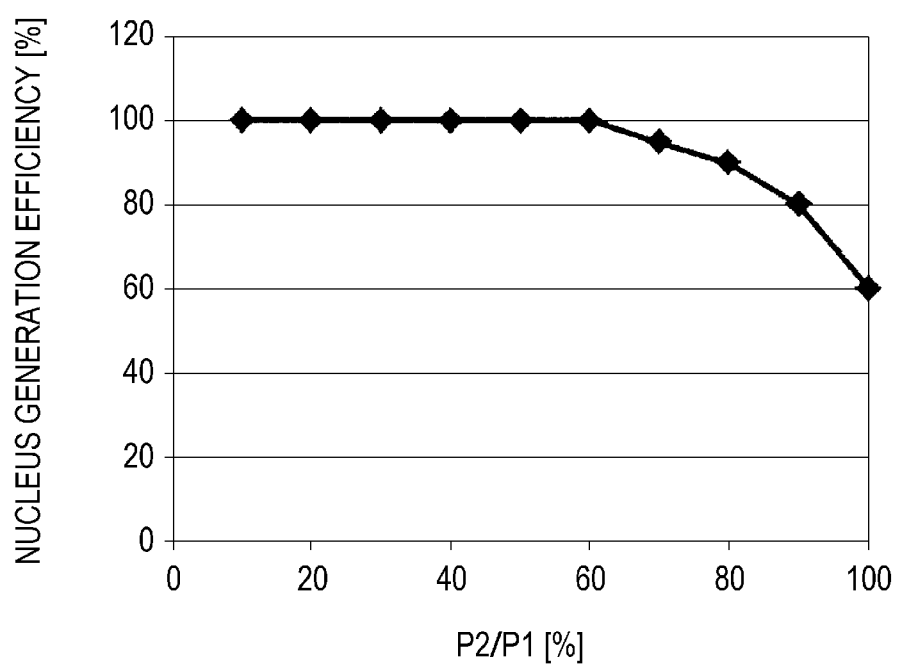
FIG. 12 is a graph indicating relation between a ratio of a projective area of a projection to a projective area of a stirrer (P2/P1) and nucleus generation efficiency.

The heat storage apparatus in Example 3 was operated in a similar manner to Operating example 4 except that the heat storage apparatus in Example 3 was used in place of the heat storage apparatus in Example 2. After an elapse of 19 seconds from start of rotation of the stirrer, the stirrer stopped. After an elapse of 450 seconds from start of rotation of the stirrer, crystallization of the heat storage material was completed. In the heat storage apparatus in Example 3, the ration of the diameter of the stirrer to the long side of the casing (longitudinal or lateral internal size) was small as 48.3%. When the stirrer stopped, the heat storage material near the stirrer looked white due to diffusion of crystalline nuclei, while the heat storage material located away from the stirrer remained transparent. The reason was that the clearance between the inner face of the casing and the stirrer was large and therefore, crystalline nuclei were hard to be diffused further from the stirrer by stirring. Consequently, in the Operating example 5, after stop of rotation of the stirrer, the heat storage material was gradually crystallized. As a result, the crystallization completion time was 450 seconds. This demonstrates that, to shorten the crystallization completion time, the stirring effect of the stirrer is important, and irrespective of the viscosity of the heat storage material, generated crystalline nuclei are diffused throughout the heat storage material in the casing.

stopped within 30 seconds from start of rotation of the stirrer. FIG. 12 illustrates the results. As illustrated in FIG. 12, when P2/P1 reached 70% or more, the nucleus generation efficiency decreased. This is due to that as the contact area of the projection with the inner face of the casing becomes large, the contact pressure of the projection with the inner face of the casing becomes smaller to reduce the pressure fluctuation caused by rotation of the stirrer. When P2/P1 was 90% or more, the nucleus generation efficiency was advantageously 80% or more.

The relation between the ratio of the surface area of the stirrer to the area of the inner face of the casing and crystallization progress ratio was examined. The cylindrical casing having internal dimension: diameter 22 mm and height 3.0 mm was prepared. A stirrer (stirrer A) having a diameter of 20 mm, the stirrer being equipped with a plurality of blades that had a width of 5 mm and a height of

TABLE 1

|  | Contact of Projection | Rotation Time [sec] | Evaluation of Rotation Time | Crystallization Completion Time [sec] | Evaluation of Cystallization Completion Time | Overall Evaluation |
| --- | --- | --- | --- | --- | --- | --- |
| Operating Example 1 | Presence | 20 | A | 60 | A | A |
| Operating Example 2 | Presence | 20 | A | 60 | A | A |
| Operating Example 3 | Presence | 10 | A | 50 | A | A |
| Operating Example 4 | Presence | 17 | A | 58 | A | A |
| Operating Example 5 | Presence | 19 | A | 450 | B | B |
| Comparative Example 1 | Absence | No stop | C | No crystallization | C | C |

When the heat storage apparatus is used to cool the inside of the automobile during idling stop, in consideration of traffic situations in urban cities, cold storage time is desirably 1 minute or less. Herein, the cold storage time corresponds to the crystallization completion time, and refers to time from start of rotation of the stirrer for release of supercooling to completion of crystallization. Operations of the heat storage apparatuses in Operating examples 1 to 4 are suitable for cooling the inside of automobiles during idling stop. Thus, it was demonstrated that the heat storage apparatuses in Examples 1 and 2 were suitable for cooling the inside of automobiles during idling stop. It was demonstrated that the heat storage apparatus in Example 3 was suitable for use in which the cold storage time of about 10 minutes was allowable.

Figure 13:
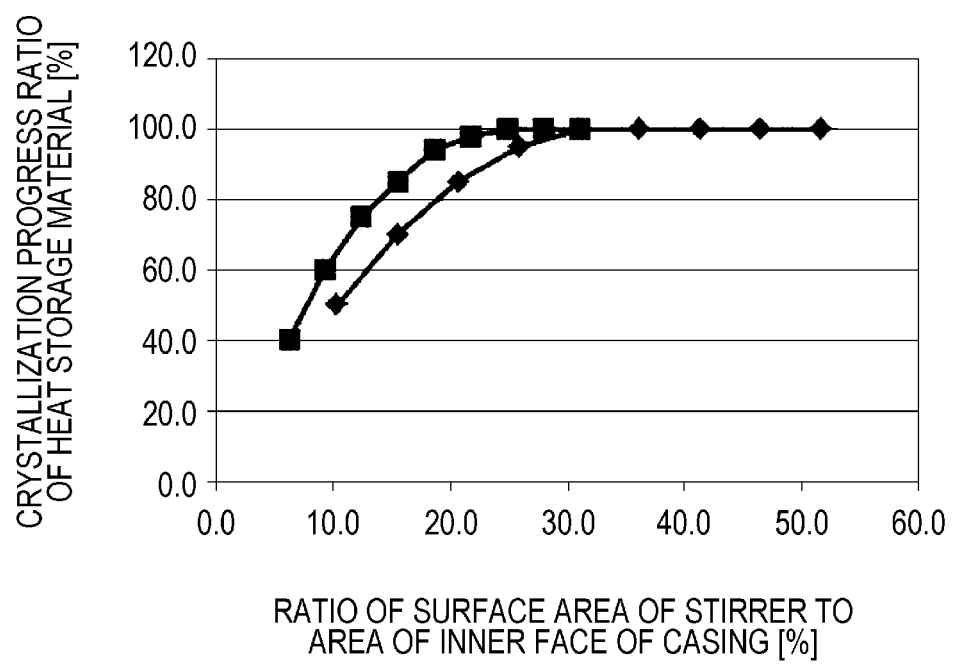
FIG. 13 is a graph indicating relation between a ratio of a surface area of the stirrer to an area of an inner face of a casing and a progress ratio of crystallization of the heat storage material.
Figure 14A:
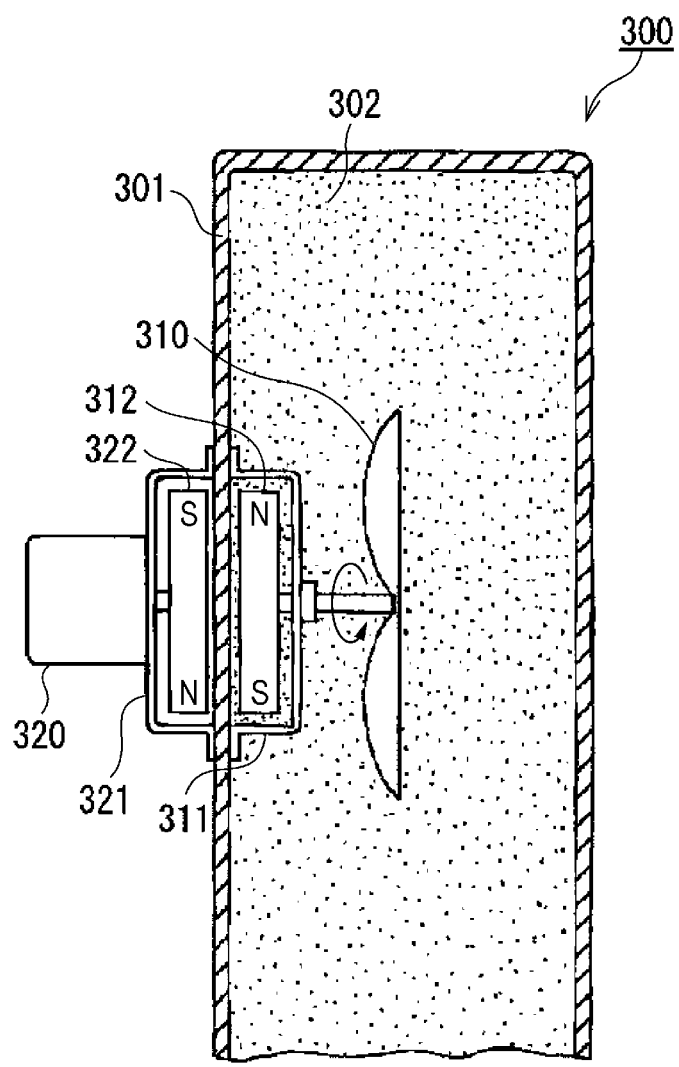
FIG. 14A is a sectional view illustrating a conventional heat storage apparatus.
Figure 14B:
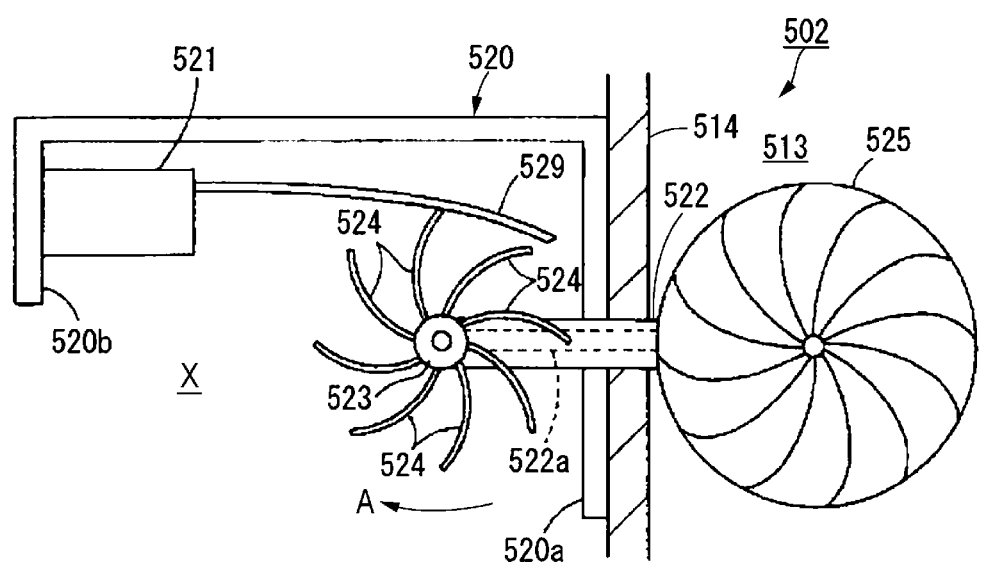
FIG. 14B is a sectional view illustrating a conventional nucleation device.

Given that areas found when the stirrer and the projection are projected onto the plane (the bottom face of the casing) that is perpendicular to the rotating axis of the stirrer in the direction that is parallel to the rotating axis are P1 and P2, respectively, the relation between P2/P1 and nucleus generation efficiency was examined. A cylindrical casing having the internal dimension: diameter 22 mm and height 3.0 mm was prepared. A rod-like stirrer of length 20 mm×width 5 mm×height 2.5 mm was prepared. The stirrer was prepared having P2/P1 in the range of 10% to 100% by adjusting the dimension of the projection attached to the stirrer. The stirrer was disposed in the casing, and the casing was filled with 40 percent by mass of TBAB solution as the heat storage material. The heat storage apparatus thus produced 20 times or more as in Operating example 4. The nucleus generation efficiency was defined as the probability that the stirrer 2.5 mm and perpendicularly extended from the rotating axis, was prepared. Further, a stirrer (stirrer B) having a diameter of 20 mm, the stirrer being equipped with a plurality of blades that had a width of 5 mm and a height of 1.5 mm and perpendicularly extended from the rotating axis, was prepared. The number of blades perpendicularly extending from the rotating axis was adjusted to 2 to 10 to change the ratio of the surface area of the stirrer to the area of the inner face of the casing. The stirrer A or the stirrer B was disposed in the casing, and the casing was filled with 40 percent by mass of TBAB solution as the heat storage material. The heat storage apparatus thus produced in a similar manner to Operating example 4. In this case, a reciprocal of crystallization completion time in each operation in terms of minutes was defined as the progress ratio of crystallization of the heat storage material after an elapse of 1 minute from start of rotation of the stirrer. However, when crystallization completion time was less than 1 minute, the progress ratio of crystallization of the heat storage material was defined as 100%. FIG. 13 illustrates the results. In FIG. 13, rhombic plots represent the results in the case of using the stirrer A, and square plots represent the results in the case of using the stirrer B. It demonstrates that the progress ratio of crystallization of the heat storage material after an elapse of 1 minute from start of rotation of the stirrer is desired to be high, and when the ratio of the surface area of the stirrer to the area of the inner face of the casing is 10% or more, the crystallization progress ratio becomes desirably 50% or more.

Example 4

A heat storage apparatus in Example 4 as illustrated in FIGS. 3A and 3B was produced. A rectangular parallelepiped-shaped casing (internal dimension: length 50 mm×width 100 mm×height 2.0 mm) was prepared. One face of the casing was made of glass, and the other face of the casing was made of stainless steel. A stirrer was disposed in the vicinity of the center of a bottom face of the casing. The stirrer had a first plate and a blade. The first plate was a disc having a diameter of 30 mm and a thickness of 0.5 mm. A columnar projection having a height of 1.3 mm and a diameter of 0.8 mm was fixed to the center of the first plate. The projection was in contact with the bottom face of the casing. Four blades were fixed to an outer circumference of the first plate at regular intervals in the rotating direction of the stirrer. Each blade had a length of 10 mm in the radial direction of the first plate, and a height of 1.6 mm. An upper end of the blade, which corresponded to a length of 2 mm in the radial direction of the first plate, was fixed to the first plate, and a remaining upper end of the blade protruded outward in the radial direction of the blade. The blade has a thickness of 1.0 mm. A portion of the stirrer was made of a magnetic material, and the magnetic field outside the casing can be changed to rotate the stirrer. The casing was filled with 40 percent by mass of TBAB solution as the heat storage material. In this manner, the heat storage apparatus in Example 4 was produced.

Operating Examples 6 and 7

In Operating example 6, the heat storage apparatus in Example 4 was operated in a similar manner to Operating example 2. In Operating example 7, the heat storage apparatus in Example 4 was operated in a similar manner to Operating example 6 except that the stirrer was rotated when the temperature of the casing reaches 3 degrees centigrade or lower. Table 2 indicates the results. In Operating examples 6 and 7, the crystallization completion time was 1 minute or less, and the heat storage apparatus in Example 4 exhibited excellent properties. The distance between the first plate and the bottom face of the casing was relatively large, and the heat storage material could be readily circulated in the space between the projection and the blade by means of rotation of the stirrer. Probably, for this reason, the heat storage apparatus in Example 4 could exhibit excellent properties.

ped-shaped casing (internal dimension: length 50 mm×width 200 mm×height 2.0 mm) was prepared. One face of the casing was made of glass, and the other face of the casing was made of stainless steel. A stirrer was disposed in the vicinity of the center of a bottom face of the casing. The same stirrer as the stirrer in the heat storage apparatus in Example 4 was used. Two current-adjusting plates (height: 2.0 mm) made of stainless steel were disposed in the casing. Each current-adjusting plate had a proximal portion extending from the vicinity of a second locus L2 that an end of the stirrer, which was furthest from the rotation axis of the stirrer, follows while the stirrer rotates, along long sides of the bottom face of the casing, and a distal portion curved in the rotating direction of the stirrer. The shortest distance between the second locus L2 and each current-adjusting plate was 0.15 mm. The shortest distance between the inner side face of the casing and each current-adjusting plate was 10 mm. A portion of the stirrer was made of a magnetic material, the magnetic field outside the casing can be changed to rotate the stirrer. The casing was filled with 40 percent by mass of TBAB solution as the heat storage material. In this manner, the heat storage apparatus in Example 5 was produced. The heat storage apparatus in Example 6 was produced in a similar manner to Example 5 except that a pair of current-adjusting plates were not provided. The heat storage apparatus in Example 7 was produced in a similar manner to Example 5 except that the shortest distance between the second locus L2 and each current-adjusting plate was changed to 3 mm, and the shortest distance between the inner side face of the casing and each current-adjusting plate was changed to 10 mm.

Operating Examples 8 to 10

In Operating example 8, the heat storage apparatus in Example 5 was operated in the same manner as in Operating example 2. In Operating example 9, the heat storage apparatus in Example 6 was operated in the same manner as in Operating example 2. In Operating example 10, the heat storage apparatus in Example 7 was operated in the same manner as in Operating example 2. Table 3 indicates the results. In Operating examples 8 to 10, the crystallization completion time was less than 10 minutes, and the heat storage apparatuses in Examples 5 to 7 exhibited good properties. Especially in Operating example 8, the crystallization completion time is 1 minute or less than or equal to, and the heat storage apparatus in Example 5 exhibited excellent properties. Even when the bottom face of the casing had a high aspect ratio, by appropriately arranging the

TABLE 2

|  | Contact of Projection | Rotation Time [sec] | Evaluation of Rotation Time | Crystallization Completion Time [sec] | Evaluation of Cystallization Completion Time | Overall Evaluation |
| --- | --- | --- | --- | --- | --- | --- |
| Operating Example 6 | Presence | 15 | A | 48 | A | A |
| Operating Example 7 | Presence | 10 to 15 | A | 35 to 45 | A | A |

Examples 5 to 7

The heat storage apparatus in Example 5 as illustrated in FIGS. 4A and 4B was produced. A rectangular parallelepicurrent-adjusting plates, the heat storage material could be flown from the vicinity of the stirrer to corners of the casing to achieve the crystallization completion time of 1 minute or less.

TABLE 3

| | Contact of Projection | Rotation Time [sec] | Evaluation of Rotation Time | Crystallization Completion Time [sec] | Evaluation of Cystallization Completion Time | Overall Evaluation |
|---|---|---|---|---|---|---|
| Operating Example 8 | Presence | 15 | A | 50 | A | A |
| Operating Example 9 | Presence | 15 | A | 400 to 500 | B | B |
| Operating Example 10 | Presence | 15 | A | 400 to 500 | B | B |

Example 8

The heat storage apparatus in Example 8 as illustrated in FIGS. 5A and 5B was produced. First, a rectangular parallelepiped-shaped casing (internal dimension: length 50 mm×width 200 mm×height 2.0 mm) was prepared. One face of the casing was made of glass, and the other face of the casing was made of stainless steel. A stirrer was disposed in the vicinity of the center of a bottom face of the casing. The stirrer had a first plate and a blade. The first plate was a disc having a diameter of 15 mm and a thickness of 0.5 mm. A columnar projection having a height of 1.3 mm and a diameter of 0.8 mm was fixed to the center of the first plate. The projection was in contact with the bottom face of the casing. Four blade are fixed to an outer circumference of the first plate at regular intervals. Each blade had a length of 7 mm in the radial direction of the first plate, and a height of 1.6 mm. An upper end of the blade, which corresponded to a length of 2 mm in the radial direction of the first plate, was fixed to the first plate, and a remaining upper end of the blade protruded outward in the radial direction of the first plate. The blade had a thickness of 1.0 mm. Two current-adjusting plate (height: 2.0 mm) made of stainless steel were disposed in the casing. Each current-adjusting plate had a proximal portion extending from the vicinity of a second locus L2 that an end of the stirrer, which was furthest from the rotation axis of the stirrer, follows while the stirrer rotates, along the bottom face of the casing, and a distal portion curved in the rotating direction of the stirrer. The shortest distance between the second locus L2 and each current-adjusting plate was 0.15 mm. The shortest distance between the inner side face of the casing and each current-adjusting plate was 16 mm. A portion of the stirrer was made of a magnetic material, the magnetic field outside the casing can be changed to rotate the stirrer. Two baffle plates made of stainless steel were attached to the casing. The baffle plate each had a first end and a second end, the first ends of the baffle plates were disposed near the second locus L2, the second ends of the baffle plates were brought into contact with the inner side face of the casing 30. The casing was filled with 40 percent by mass of TBAB solution as the heat storage material. In this manner, the heat storage apparatus in Example 8 was produced.

Example 9

The heat storage apparatus in Example 9 as illustrated in FIGS. 6A and 6B was produced. First, a rectangular parallelepiped-shaped casing (internal dimension: length 50 mm×width 200 mm×height 2.0 mm) was prepared. One face of the casing was made of glass, and the other face of the casing was made of stainless steel. The stirrer was disposed 50 mm away from one short side of the bottom face of the casing. The same stirrer as the stirrer in the heat storage apparatus in Example 8 was used. Two current-adjusting plate (height: 2.0 mm) made of stainless steel were disposed in the casing. In the direction parallel to long sides of the bottom face of the casing, one current-adjusting plate was larger than the other current-adjusting plate. Each current-adjusting plate had a proximal portion extending from the vicinity of a second locus L2 that an end of the stirrer, which was furthest from the rotation axis of the stirrer, follows while the stirrer rotates, along long sides of the bottom face of the casing, and a distal portion curved in the rotating direction of the stirrer. The shortest distance between the second locus L2 and each current-adjusting plate was 0.15 mm. The shortest distance between the inner side face of the casing and each current-adjusting plate was 16 mm. Two baffle plates made of stainless steel were attached to the casing. The baffle plates each had a first end and a second end, the first ends of the baffle plates were disposed near the second locus L2, and the second ends of the baffle plates were brought into contact with the inner side face of the casing. The casing was filled with 40 percent by mass of TBAB solution as the heat storage material. In this manner, the heat storage apparatus in Example 9 was produced.

Example 10

The heat storage apparatus in Example 10 as illustrated in FIGS. 7A and 7B was produced. First, a rectangular parallelepiped-shaped casing (internal dimension: length 100 mm×width 100 mm×height 2.0 mm) was prepared. One face of the casing was made of glass, and the other face of the casing was made of stainless steel. A stirrer was disposed near the center of the bottom face of the casing. The same stirrer as the stirrer in the heat storage apparatus in Example 8 was used. Four current-adjusting plates (height: 2.0 mm) made of stainless steel were radially disposed in the casing. Each current-adjusting plate had a proximal portion and a distal portion. The proximal portion extended from the vicinity of a second locus L2 that an end of the stirrer, which was furthest from the rotation axis of the stirrer, follows while the stirrer rotates, along a diagonal line of the bottom face of the casing. The distal portion was curved near the proximal portion in the rotating direction of the stirrer, and extended along one side of the bottom face of the casing. The distal portion had two slits having a width of 5 mm. The shortest distance between of the second locus L2 and each current-adjusting plate was 0.15 mm. The shortest distance between the inner side face of the casing and each current-adjusting plate was 10 mm. The casing was filled with 40 percent by mass of TBAB solution as the heat storage material. In this manner, the heat storage apparatus in Example 10 was produced.

Example 11

A heat storage apparatus in Example 11 as illustrated in FIGS. 8A and 8B was produced. First, cylindrical casing (internal dimension: diameter 100 mm, height 2.0 mm) was prepared. One face of the casing was made of glass, and the other face of the casing was made of stainless steel. A stirrer was disposed near the center of the bottom face of the casing. The same stirrer as the stirrer in the heat storage apparatus in Example 8 was used. Four current-adjusting plates (height: 2.0 mm) made of stainless steel were radially disposed at regular intervals in the casing. Each of the current-adjusting plate had a proximal portion and a distal portion. The proximal portion extended outward in the radial direction of the bottom face of the casing from the vicinity of a second locus L2 that an end of the stirrer, which was furthest from the rotation axis of the stirrer, follows while the stirrer rotates. The distal portion was curved in the rotating direction of the stirrer. The shortest distance between the second locus L2 and each current-adjusting plate was 0.15 mm. The shortest distance between the inner side face of the casing and each current-adjusting plate was 10 mm. The casing was filled with 40 percent by mass of TBAB solution as the heat storage material. In this manner, heat storage apparatus in Example 11 was produced.

Operating Examples 11 to 14

In Operating example 11, the heat storage apparatus in Example 8 was operated in the same manner as in Operating example 2. In Operating example 12, the heat storage apparatus in Example 9 was operated in the same manner as in Operating example 2. In Operating example 13, the heat storage apparatus in Example 10 was operated in the same manner as in Operating example 2. In Operating example 14, the heat storage apparatus in Example 11 was operated in the same manner as in Operating example 2. Table 4 indicates the results. In Operating examples 11 to 14, the crystallization completion time was 1 minute or less, and the heat storage apparatus in Examples 8 to 11 exhibited excellent properties.

TABLE 4

| | Contact of Projection | Rotation Time [sec] | Evaluation of Rotation Time | Crystallization Completion Time [sec] | Evaluation of Cystallization Completion Time | Overall Evaluation |
|---|---|---|---|---|---|---|
| Operating Example 11 | Presence | 20 | A | 55 | A | A |
| Operating Example 12 | Presence | 20 | A | 60 | A | A |
| Operating Example 13 | Presence | 20 | A | 58 | A | A |
| Operating Example 14 | Presence | 20 | A | 53 | A | A |

Example 12

The heat storage apparatus in Example 12 as illustrated in FIGS. 9A and 9B was produced. First, rectangular parallelepiped-shaped casing (internal dimension: length 50 mm×width 200 mm×height 2.0 mm) was prepared. One face of the casing was made of glass, and the other face of the casing was made of stainless steel. A stirrer was disposed in the bottom face of the casing. The same stirrer as the stirrer in the heat storage apparatus in Example 4 was used. Four pairs of (eight) current-adjusting plates (height: 2.0 mm) that had different sizes and were made of stainless steel were disposed in the casing. The current-adjusting plates each had a proximal portion and a distal portion. Each of the current-adjusting plates was U-shaped to be opened to the stirrer and curved in the distal portion. Each pair of current-adjusting plates included two current-adjusting plates opposed to each other in opposite directions. The four current-adjusting plates opened in the same direction among the four pairs of current-adjusting plates were disposed at predetermined intervals such that the smaller current-adjusting plate was arranged on the inner side of the larger current-adjusting plate. This formed a U-shaped flow path between the adjacent current-adjusting plates. The shortest distance between a second locus L2 that an end of the stirrer, which was furthest from the rotation axis of the stirrer, follows while the stirrer rotates and the current-adjusting plate was 0.15 mm. The shortest distance between the inner side face of the casing and the largest current-adjusting plate was 4.2 mm. The casing was filled with 40 percent by mass of TBAB solution as the heat storage material. In this manner, the heat storage apparatus in Example 12 was produced.

Example 13

The heat storage apparatus in Example 13 as illustrated in FIGS. 10A and 10B was produced. First, rectangular parallelepiped-shaped casing (internal dimension: length 50 mm×width 200 mm×height 19.5 mm) was prepared. One face of the casing was made of glass, and the other face of the casing was made of stainless steel. The stirrer was disposed near the center of the bottom face of the casing. The stirrer had six discs having a diameter of 30 mm and a thickness of 0.5 mm, four blades, and a projection (rotating shaft). The six discs were disposed along the rotation axis of the stirrer and perpendicular to the rotating axis. The distance between the discs was 2.3 mm. The distance between the disc that is closest to the bottom face of the casing and the bottom face was 2.5 mm, and the distance between the disc that is closest to the top face opposed to the bottom face of the casing and the top face was 2.5 mm. Each of the discs had four circular through holes each having a diameter of 10 mm, and the centers of the four through holes were evenly separated from the center of the disc. The projection had a height of 19.5 mm and a diameter of 0.8 mm, and was fixed to the center of each of the discs. One end of the projection was in contact with the bottom face of the casing, and the other end of the projection was in contact with the top face of the casing. The four blades were fixed to the outer circumference of each disc at regular intervals in the rotating direction of the stirrer. Each blade had a length of 10 mm in the radial direction of the disc, and a height of 18.5 mm. An inner portion of the blade, which corresponds to a length of 2 mm in the radial direction of the disc, is fixed to the disc, and the remaining portion (outer portion) of the blade protruded outward in the radial direction of the disc. The blade had a thickness of 1.5 mm. On the other side of a second locus L2 that the end of the stirrer, which is furthest from the rotation axis of the stirrer, follows while the stirrer follows, the internal space of the casing was partitioned with seven pairs of partitions that had a thickness of 0.5 mm and are made of stainless steel in the rotation axis of the stirrer. In the rotation axis of the stirrer, the distance between the partitions was 2.0 mm, the distance between the partition closest to the bottom face of the casing and the bottom face was 2.0 mm, and the distance between the partition closest to the top face of the casing and the top face was 2.0 mm. A current-adjusting plate was disposed in each space partitioned by the partitions. The current-adjusting plate had a proximal portion that extends from the vicinity of the second locus L2 along the long side of the bottom face of the casing, and a distal portion curved in the rotating direction of the stirrer. The shortest distance between the second locus L2 and each current-adjusting plate was 0.15 mm. The shortest distance between the inner side face of the casing and each current-adjusting plate was 10 mm. A portion of the stirrer was made of a magnetic material, the magnetic field outside the casing can be changed to rotate the stirrer. The casing was filled with 40 percent by mass of TBAB solution as the heat storage material. In this manner, the heat storage apparatus in Example 13 was produced.

Operating Examples 15 and 16

In Operating example 15, the heat storage apparatus in Example 12 was operated in the same manner as in Operating example 2. In Operating example 16, the heat storage apparatus in Example 13 was operated in the same manner as in Operating example 2. Table 5 indicates the results. In Operating examples 15 and 16, the crystallization completion time was 1 minute or less, and the heat storage apparatuses in Examples 12 and 13 exhibited excellent properties. Since plural pairs of current-adjusting plates were densely disposed, the heat storage apparatus in Example 12 could exhibit excellent properties. Despite of the casing having a relatively large internal space, the heat storage apparatus in Example 13 could exhibit excellent properties. The reasons are as follows: (i) The partitions were arranged at intervals of 2 mm to rapidly radiate crystallization heat to the outside of the casing, and (ii) Crystalline nuclei moved to each space partitioned with the partitions through the through holes formed in the discs.

TABLE 5

| | Contact of Projection | Rotation Time [sec] | Evaluation of Rotation Time | Crystallization Completion Time [sec] | Evaluation of Cystallization Completion Time | Overall Evaluation |
|---|---|---|---|---|---|---|
| Operating Example 15 | Presence | 15 | A | 46 | A | A |
| Operating Example 16 | Presence | 20 | A | 60 | A | A |

The heat storage apparatus of the present disclosure can be applied to a system that can cold required for cooling as latent heat, and take cold stored at a particular temperature in the vicinity of melting point. The heat storage apparatus of the present disclosure can be implemented using a low-temperature heat storage material as well as freezing, refrigerating, or high-temperature latent heat storage material.

What is claimed is:
1. A heat storage apparatus, comprising:
a casing;
a heat storage material that is located in the casing;
a stirrer that is located in the casing, that is in contact with the heat storage material, and that rotates to stir the heat storage material; and
a projection that is in contact with the heat storage material, that projects from the stirrer, and that rotates with a rotation of the stirrer, wherein
the projection is continuously in direct contact with an inner surface of the casing while the stirrer rotates.
2. The heat storage apparatus according to claim 1, wherein the stirrer starts rotation, stops rotation, or changes rotation speed according to a physical change occurred outside the casing.
3. The heat storage apparatus according to claim 1, wherein the stirrer includes a magnetic material, is isolated from the outside of the casing, and rotates according to a change in a magnetic field generated outside the casing.
4. The heat storage apparatus according to claim 1, wherein given that areas found when the stirrer and the projection are projected onto a plane that is perpendicular to a rotating axis of the stirrer in a direction that is parallel to the rotating axis are P1 and P2, respectively, P2 is 90% of P1 or less.
5. The heat storage apparatus according to claim 1, wherein
the stirrer and the projection include metal or alloy,
the stirrer is not in contact with the inner face of the casing while the stirrer rotates, and
a sum of surface areas of the stirrer and the projection is 10% of an area of the inner face of the casing or more.
6. The heat storage apparatus according to claim 1, wherein
the stirrer is shaped like a plate having a flat face or a curved face, a rotating axis of the stirrer passes the center of gravity of the stirrer and a tip of the projection,
the projection has a portion having a gradually-reduced cross-sectional area taken along a plane perpendicular to the rotating axis toward the tip, and
when viewed along the rotating axis, portion of the projection is absence
so as not to overlap the stirrer.
7. An heat storage, comprising:
a casing;
a heat storage material that is located in the casing;
a stirrer that is located in the casing, that is in contact with the heat storage material, and that rotates to stir the heat storage material; and
a projection that is in contact with the heat storage material, that projects from the stirrer, and that rotates with a rotation of the stirrer, wherein the projection is continuously in contact with an inner surface of the casing while the stirrer rotates,
the stirrer includes:
a first plate that has the center of gravity on a rotating axis of the stirrer, and that is disposed about the rotating axis; and
a blade that is fixed to the first plate away from the center of gravity of the first plate, that is thicker than a thickness of the first plate in a direction that is perpendicular to a principal face of the first plate, and that has a front face that is in contact with the heat storage material in a rotating direction of the stirrer, and
the heat storage apparatus further comprises a first space,
the first space is present between the inner face of the casing and the first plate along the rotating axis of the stirrer,
given that a portion of the blade that is closest to the rotating axis of the stirrer is defined as a first end, and a locus that the first end follows while the stirrer rotates is defined as a first locus,
the first space is present between the first locus and the projection, and
with rotation of the stirrer, the heat storage material is able to circulate the first space.

8. The heat storage apparatus according to claim 7, wherein a distance between the rotating axis of the stirrer and the first end is in a range of 40% to 100% of a distance between an end of the first plate furthest from the rotating axis of the stirrer and the rotating axis.

9. The heat storage apparatus according to claim 7, wherein a shortest distance between the inner face of the casing and the first plate is 2 to 100 times as the thickness of the first plate.

10. The heat storage apparatus according to claim 7, wherein
the casing has an opposed face that faces the inner face of the casing, and
a distance between the inner face of the casing and the first plate is larger than a distance between the opposed face of the casing and the first plate along the rotating axis of the stirrer.

11. The heat storage apparatus according to claim 7, further comprising
given that a portion of the projection that is furthest from the rotating axis of the stirrer is defined as a second end, and a locus that the first end follows while the stirrer rotates is defined as a second locus,
a current-adjusting plate that is disposed in the casing, that is located on the outer side of the second locus in a direction that is perpendicular to the rotating axis, and that has a proximal portion and a distal portion located further from the second locus than the proximal portion.

12. The heat storage apparatus according to claim 11, wherein
the casing has an inner side face that extends from and end of the inner face of the casing along the rotating axis of the stirrer to surround the stirrer,
the current-adjusting plate is located away from the inner side face, and
a shortest distance between the second locus and the current-adjusting plate is smaller than a distance between the inner side face of the casing and the current-adjusting plate.

13. The heat storage apparatus according to claim 11, wherein
the casing has an opposed face that faces the inner face of the casing, and
the current-adjusting plate is made of a material having a higher thermal conductivity than a thermal conductivity of the heat storage material, and
the current-adjusting plate is in contact with the inner face of the casing and the opposed face.

14. The heat storage apparatus according to claim 11, wherein the distal portion of the current-adjusting plate is curved in the rotating direction of the stirrer.

15. The heat storage apparatus according to claim 11, wherein
the inner face of the casing is a rectangle having a long side that is twice of a short side or more in length, and
the proximal portion extends along the long side of the inner face.

16. The heat storage apparatus according to claim 11, wherein
the inner face of the casing is a rectangle having a long side that is twice of a short side or more in length, square, or circular, and
the plurality of radially arranged current-adjusting plate are provided.

17. The heat storage apparatus according to claim 11, wherein the current-adjusting plate is U-shaped so as to be opened to the second locus and curved in the distal portion.

18. The heat storage apparatus according to claim 7, wherein
the casing has an opposed face that faces the inner face of the casing, and
the stirrer further includes a second plate that has the center of gravity on the rotating axis of the stirrer, and that is disposed between the opposed face and the first plate along the rotating axis of the stirrer, and about the rotating axis,
the first plate has a first through hole, and
the second plate has a second through hole.

19. The heat storage apparatus according to claim 18, further comprising
given that a portion of the projection that is furthest from the rotating axis of the stirrer is defined as a second end, and a locus that the first end follows while the stirrer rotates is defined as a second locus,
a partition that is located on the outer side of the second locus and that partitions an internal space of the casing along the rotating axis of the stirrer.

20. The heat storage apparatus according to claim 19, further comprising a plurality of current-adjusting plates that are disposed in respective spaces partitioned by the partition, and that each have a proximal portion and a distal portion located further from the second locus than the proximal portion.

* * * * *